United States Patent
Nammi et al.

(10) Patent No.: US 10,003,987 B2
(45) Date of Patent: Jun. 19, 2018

(54) METHOD FOR TRANSMITTING DATA TO A WIRELESS DEVICE IN A COMMUNICATIONS NETWORK WHICH APPLIES A COMBINED CELL DEPLOYMENT

(71) Applicant: Telefonaktiebolaget L M Ericsson (publ), Stockholm (SE)

(72) Inventors: Sairamesh Nammi, Kista (SE); Per Skillermark, Årsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days. days.

(21) Appl. No.: 14/907,365

(22) PCT Filed: Nov. 25, 2013

(86) PCT No.: PCT/SE2013/051385
§ 371 (c)(1),
(2) Date: Jan. 25, 2016

(87) PCT Pub. No.: WO2015/020577
PCT Pub. Date: Feb. 12, 2015

(65) Prior Publication Data
US 2016/0183111 A1 Jun. 23, 2016

Related U.S. Application Data

(60) Provisional application No. 61/863,464, filed on Aug. 8, 2013.

(51) Int. Cl.
*H04W 24/08* (2009.01)
*H04B 7/04* (2017.01)
(Continued)

(52) U.S. Cl.
CPC ............ *H04W 24/08* (2013.01); *H04B 7/024* (2013.01); *H04B 7/04* (2013.01); *H04L 25/0224* (2013.01);
(Continued)

(58) Field of Classification Search
CPC ....... H04B 7/04; H04B 7/024; H04L 25/0224; H04L 27/261; H04W 24/08; H04W 16/32
See application file for complete search history.

(56) References Cited

U.S. PATENT DOCUMENTS

2003/0054847 A1* 3/2003 Kim .................... H04W 52/226
455/517
2011/0065448 A1* 3/2011 Song .................... H04B 7/0632
455/452.2

(Continued)

OTHER PUBLICATIONS

Ericsson, ST-Ericsson 'Analysis of Probing Pilots for Spatial Reuse Mode in Combined Cel! Deployment' In: 3GPP TSG RAN WG1 Meeting #72bis, R1-131540, Chicago, USA, Apr. 15-Apr. 19, 2013, Apr. 6, 2013, XP050697327; whole document; Section 3.*

(Continued)

*Primary Examiner* — Charles C Jiang
*Assistant Examiner* — Kyaw Z Soe
(74) *Attorney, Agent, or Firm* — Withrow & Terranova, PLLC

(57) ABSTRACT

The embodiments herein relates to a method in a communications network. A first probing pilot signal is transmitted from a first network node to a wireless device. The first probing pilot signal is unique for the first network node. A second signal is transmitted from the first network node to the wireless device. The second signal is unique for the first network node. The first probing pilot signal together the second signal enables identification of that the first network node is suitable to transmit data to the wireless device. A first and second set of channel state parameters is transmitted (Continued)

from the wireless device to the central network node which identifies that the first network node is suitable to transmit data to the wireless device since it is substantially close to the first network node.

1 Claim, 16 Drawing Sheets

(51) Int. Cl.
*H04L 25/02* (2006.01)
*H04L 27/26* (2006.01)
*H04B 7/024* (2017.01)
*H04W 16/32* (2009.01)
*H04W 84/04* (2009.01)
*H04W 48/14* (2009.01)
*H04W 64/00* (2009.01)

(52) U.S. Cl.
CPC ........... *H04L 27/261* (2013.01); *H04W 16/32* (2013.01); *H04W 48/14* (2013.01); *H04W 64/00* (2013.01); *H04W 84/047* (2013.01)

(56) References Cited

U.S. PATENT DOCUMENTS

| | | | | |
|---|---|---|---|---|
| 2011/0237272 | A1* | 9/2011 | Gorokhov | H04B 7/024 455/452.1 |
| 2012/0026940 | A1* | 2/2012 | Barbieri | H04L 5/0032 370/328 |
| 2012/0201319 | A1 | 8/2012 | Asplund et al. | |
| 2013/0072123 | A1* | 3/2013 | Garavaglia | H04L 1/0026 455/63.1 |
| 2013/0102305 | A1* | 4/2013 | Liu | H04W 24/02 455/422.1 |
| 2013/0155968 | A1* | 6/2013 | Pelletier | H04L 5/0023 370/329 |
| 2013/0195008 | A1* | 8/2013 | Pelletier | H04B 7/0417 370/328 |
| 2015/0296401 | A1* | 10/2015 | Hamilton | H04W 36/0083 370/252 |

OTHER PUBLICATIONS

Ericsson, et al., "R1-124512: Initial considerations on Heterogeneous Networks for UMTS," 3rd Generation Partnership Project (3GPP), TSG RAN WG1 Meeting #70bis, Oct. 8-12, 2012, 7 pages, San Diego, California.

Ericsson, et al., "R1-124513: Heterogeneous Network Deployment Scenarios," 3rd Generation Partnership Project (3GPP), TSG-RAN WG1 #70bis, Oct. 8-12, 2012, 3 pages, San Diego, California.

Ericsson, et al., "R1-131540: Analysis of Probing Pilots for Spatial Reuse Mode in Combined Cell Deployment," 3rd Generation Partnership Project (3GPP), TSG RAN WG1 Meeting #72bis, Apr. 15-19, 2013, 9 pages, Chicago, Illinois.

Ericsson, et al., "R1-132603: Overview of Spatial Reuse Mode in Combined Cell Deployment for Heterogeneous Networks," 3rd Generation Partnership Project (3GPP), TSG RAN WG1 Meeting #73, May 20-24, 2013, 7 pages, Fukuoka, Japan.

Huawei, et al., "RP-121436: Proposed SID: Study on UMTS Heterogeneous Networks," 3rd Generation Partnership Project (3GPP), Work Item, TSG RAN Meeting #57, Sep. 4-7, 2012, 5 pages, Chicago, Illinois.

International Search Report for International Patent Application No. PCT/SE2013/051385, dated Sep. 30, 2014, 12 pages.

* cited by examiner

METHOD FOR TRANSMITTING DATA TO A WIRELESS DEVICE IN A COMMUNICATIONS NETWORK WHICH APPLIES A COMBINED CELL DEPLOYMENT

This application is a 35 U.S.C. § 371 national phase filing of International Application No. PCT/SE2013/051385, filed Nov. 25, 2013, which claims priority to Provisional Application No. 61/863,464, filed Aug. 8, 2013, the disclosures of which are incorporated herein by reference in their entireties.

TECHNICAL FIELD

Embodiments herein relate generally to a first network node, a method in the first network node, a wireless device, a method in the wireless device, a central network node and a method in the central network node. More particularly the embodiments herein relate to enabling transmission of data to a wireless device in a communications network which applies a combined cell deployment.

BACKGROUND

In a typical communications network a wireless device, communicates via a Radio Access Network (RAN) to one or more Core Networks (CNs). The communications network may also be referred to as e.g. a wireless communications network, a wireless communications system, a communications network, a communications system, a network or a system.

The wireless device may be a device by which a subscriber may access services offered by an operator's network and services outside the operator's network to which the operator's RAN and CN provide access, e.g. access to the Internet. The wireless device may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device may be portable, pocket storable, hand held, computer comprised, or vehicle mounted devices, enabled to communicate voice and/or data, via the RAN, with another entity, such as another wireless device or a server.

The wireless devices are enabled to communicate wirelessly within the communications network. The communication may be performed e.g. between two wireless devices, between a wireless device and a regular telephone and/or between the wireless device and a server via the RAN and possibly one or more CNs and possibly the Internet.

The communications network covers a geographical area which may be divided into cell areas. Each cell area is served by at least one base station. The base station may be called Radio Base Station (RBS), evolved Node B (eNB), eNodeB, NodeB, B node, or Base Transceiver Station (BTS), depending on the technology and terminology used. The base station communicates with the wireless device(s) within range of the base station. Each cell is identified by an identity within the local radio area, which may be broadcast in the cell. Thus, the base station in a cell may also be identified using the cell identifier.

Cellular operators have started to offer mobile broadband based on Wideband Code Division Multiple Access/High Speed Packet Access (WCDMA/HSPA) during the last few years. Further, fuelled by new devices designed for data applications, the end user performance requirements are steadily increasing. The large uptake of mobile broadband has resulted in that the traffic volumes that need to be handled by the HSPA networks have grown significantly. Therefore, techniques that allow cellular operators to manage their spectrum resources more efficiently are of large importance.

WCDMA, mentioned above, is an air interface standard found in Third Generation (3G) communications networks and is a commonly used member of the Universal Mobile Telecommunications System (UMTS) family. WCDMA is sometimes used as a synonym for UMTS. HSPA may be described as a combination of High Speed Downlink Packet Access (HSDPA) and High Speed Uplink Packet Access (HSUPA) and is an evolution of UMTS. HSDPA, also be referred to as 3,5G, turbo-3G or super 3G, is a communications protocol for data transmission in the HSPA family. HSDPA allows networks based on UMTS to have higher data transfer speeds and capacity.

Techniques whereby it is possible to improve the DownLink (DL) performance may involve introducing support for four branch Multiple Input Multiple Output (MIMO), multiflow communication, multi carrier deployment etc. Four branch MIMO may also be referred to as four way MIMO, 4×4 MIMO etc. Since improvements in spectral efficiency per link are approaching theoretical limits, the next generation technology is about to improve the spectral efficiency per unit area. In other words, the additional features for HSDPA need to provide a high area capacity as well as increased user performance; both for a typical user and for cell-edge users. Currently, Third Generation Partnership Project (3GPP) has been working on this aspect of using Heterogeneous networks.

MIMO, mentioned above, is a technology where multiple antennas are used at both the transmitter and receiver to improve communication performance. The terms input and output refer to the radio channel carrying the signal, not to the devices having antennas. For example, compared to a traditional 1×1 antenna system, a 2×2 MIMO system is expected to deliver significant cell throughput gain. MIMO may also be referred to as smart or intelligent antenna. MIMO may be sub-divided into three main categories, precoding, spatial multiplexing and diversity coding.
Homogeneous Networks:

A homogeneous network is a network of base stations in a planned, regular layout and a collection of wireless devices in which all base stations have similar transmit power levels, antenna patterns, receiver noise floors, and similar backhaul connectivity to the data network. Moreover, all base stations serve roughly the same number of wireless devices. Current communications networks comes under this category for example Global System for Mobil Communications (GSM), WCDMA, HSPA, Long Term Evolution (LTE), Worldwide interoperability for Microwave access (WiMax), etc.
Heterogeneous Networks:

In heterogeneous networks, in addition to the planned or regular placement of macro base stations 101, several pico/femto/relay base stations 103 are deployed as shown in FIG. 1. The macro base station 101 may also be referred to as a macro node or a macro network node. The macro node 101 serves a macro cell 105 and each pico/femto/relay base stations 103 serve a respective small cell 108. Note that the power transmitted by these pico/femto/relay base stations 103 is relatively small compared to that of macro base stations 101. For example 2 Watt (W) as compared to 40 W for macro base stations 101. Therefore, the pico/femto/relay base stations 103 may be referred to as Low Power network Nodes (LPN). These low power network nodes may be deployed to eliminate coverage holes in the homogeneous networks (using macro base stations 101 only) or to improve performance at high loads and enhance capacity, e.g., in traffic hot-spots. Due to their lower transmit power and smaller physical size, the low power network nodes may offer flexible site acquisitions. In FIG. 1 the heterogeneous networks is exemplified to comprise seven (7) pico/femto/ relay base stations 103 which may be low power network nodes. However, the skilled person will understand that a heterogeneous network may comprise any number of pico/ femto/relay base stations 103 different from 7.

The pico/femto/relay base stations 103 in a heterogeneous network may have:
a) Different cell Identifier (ID) as that of macro cell (different cells)
b) Same cell ID as that of macro cell (soft, shared, or combined cell)

Combined Cell in a Heterogeneous Network

As mentioned above, heterogeneous networks may be divided into two categories, in which:
a) Low power network nodes have different cell IDs as that of the macro network node.
b) Low power network nodes have same cell ID as that of the macro network node.

FIG. 2 shows an embodiment of a heterogeneous network where low power network nodes create different cells. In FIG. 2, the heterogeneous network comprises a macro network node 101, a first low power network node 103b and a second low power node 103c. The heterogeneous network comprises three cells: cell A 105, cell B 108b and cell C 108c. The cell A 105 is a macro cell is served by the macro network node 101, cell B 108b is served by the first low power network node 103b and cell C 108c is served by the second low power network node 103c. Simulations show that using low power network nodes 103b, 103c in a macro cell 105 offloads the macro network node 101, and the area splitting provided by the low power network nodes 103b, 103c further results in large gains in terms of system throughout as well as cell edge user throughput. A CPICH is a downlink channel broadcast by a network node, such as e.g. the macro network node 101.

One disadvantage of the current technology may be that each low power network node cell creates a different cell ID. Hence, a wireless device needs to do soft handover when moving from one low power network node to a macro network node or to another low power network node. Hence, the number of handovers, as well as the higher layer signaling needed to perform handovers, increases.

FIG. 3 shows the heterogeneous network where the first low power network node 103b and the second low power network node 103c, in addition to the macro network node 101, are part of the macro cell A 105. This is sometimes called a soft cell, shared cell or combined cell. This set up avoids the frequent soft handovers, hence higher layer signaling. A CPICH is a downlink channel broadcast by a network node, such as e.g. the macro network node 101.

FIG. 4 shows an embodiment of a configuration of a combined cell deployment where a central controller 401 in the combined cell 105 takes responsibility for collecting operational statistics information of network environment measurements. The decision of which network node(s) that may transmit to a specific wireless device is made by the central controller 401 based on the information provided by the wireless device or on its own. The cooperation among various network nodes, such as e.g. a low power network node 103, may be instructed by the central controller 401 and implemented in a centralized way.

In a communications network with a combined cell deployment, transmitting the same signal from each network node causes wastage of resources and does not provide capacity benefits when the load of the combined cell is high. One method to increase the capacity of the combined cell deployment may be to reuse the resources (e.g. spreading codes or channelization codes) among various nodes. This is sometimes called spatial reuse. FIG. 5 shows the configuration of spatial reuse between two network nodes, i.e. network node A 501a and network node B 501b in a combined cell. Network node A 501a communicates with a wireless device A 503a and network node B 501b communicates with a wireless device B 503b. Note that these two network nodes 501a, 501b share the same scrambling codes, and also spreading codes or channelization codes. In other words, the network node A 501a and the network node B 501b each comprises the scrambling (S) code S1 and the channelization (c) code c1-14. Thus, S1 and c1 are reused by both network nodes A and B 501a, 501b.

According to the 3GPP, "Spreading is applied to the physical channels. It consists of two operations. The first is the channelization operation, which transforms every data symbol into a number of chips, thus increasing the bandwidth of the signal. The number of chips per data symbol is called the Spreading Factor (SF). The second operation is the scrambling operation, where a scrambling code is applied to the spread signal." A channelization code is used to spread the data symbol before they are scrambled. The channelization code may also be referred to as a spreading code. The scrambling code may be divided into 512 sets each of a primary scrambling code and 15 secondary scrambling codes. There is a one-to-one mapping between each primary scrambling code and 15 secondary scrambling codes in a set such that the i:th primary scrambling code corresponds to the i:th set of secondary scrambling codes, where i=0 . . . 511. The set of primary scrambling codes is further divided into 64 scrambling code groups, each consisting of 8 primary scrambling codes. Each cell is allocated one and only one primary scrambling code.

CPICH, mentioned above, may be described as a downlink channel broadcast by a network node with constant power and of a known bit sequence or as a fixed rate downlink physical channel that carries a pre-defined bit sequence. The rate may be 30 kbps and the spreading factor may be SF=256. Its power may be between 5% and 15% of the total network node transmit power. There may be types of CPICH: a Primary-CPICH (P-CPICH) and a Secondary-CPICH (S-CPICH). Some of the characteristics of the P-CPICH are that the same channelization code is always used for the P-CPICH, that the P-CPICH is scrambled by the primary scrambling code, that there is one and only one P-CPICH per cell and that the P-CPICH is broadcast over the entire cell. Some characteristics of the S-CPICH is that an arbitrary channelization code of SF=256 is used for the S-CPICH, that the S-CPICH is scrambled by either the primary or a secondary scrambling code and that there may be zero, one, or several S-CPICH per cell, that an S-CPICH may be transmitted over the entire cell or only over a part of the cell. Another characteristic of the S-CPICH is that an S-CPICH that is intended to be used as phase reference for the second, third or fourth transmit antenna by wireless devices configured in MIMO mode or in MIMO mode with four transmit antennas may be transmitted over the entire cell using the primary scrambling code and the antenna 1 pattern.

A Pilot CHannel (PICH) is a term used in the WCDMA/HSPA RAN1 specification and is a term for a pilot (signal) or reference signal. Examples among the existing PICH include the P-CPICH, which is nothing but a pilot signal (reference signal) that the wireless devices use for certain measurement purposes. Similarly, the S-CPICH is also used by the wireless devices for certain measurements.

It is well known that multiple antennas employed at the network node and the wireless device may significantly increase the system capacity. In a heterogeneous network deployment, by deploying multiple antennas at all network nodes or at a subset of network nodes it may be possible to increase the system capacity by reusing the resources (i.e. sources such as spreading/scrambling codes and frequency) at antennas level as well as at network node level. Unfortunately there are some challenges associated when deploying multiple antennas in a combined cell. One problem is how to identify which network node that is suitable for transmitting data to a specific wireless device when the wireless device is operating in MIMO mode.

SUMMARY

An object of the embodiments herein is therefore to obviate at least one of the above disadvantages and to provide improved utilization of resources in a communications network.

According to a first aspect, the object is achieved by a method in a communications network for enabling transmission of data to a wireless device. The communications network applies a combined cell deployment. The communications network comprises a first network node, a wireless device and a central network node arranged to communicate with each other. The communications network transmits a first probing pilot signal from a first network node to the wireless device. The first probing pilot signal is unique for the first network node. The communications network transmits a second signal from the first network node to the wireless device. The second signal is unique for the first network node. The first probing pilot signal together the second signal enables identification of that the first network node is suitable to transmit data to the wireless device. The communications network transmits a first and second set of channel state parameters from the wireless device to the central network node. The first and second set of channel state parameters are estimated by the wireless device based on the first probing pilot signal and the second signal. Based on the first and second set of channel state parameters, the communications network identifies, at the central network node, that the first network node is suitable to transmit data to the wireless device since it is substantially close to the first network node.

According to a second aspect, the object is achieved by a method in a first network node for enabling transmission of data to a wireless device in a communications network which applies a combined cell deployment. The first network node transmits a first probing pilot signal to the wireless device. The first probing pilot signal is unique for the first network node. The first network node transmits a second signal to the wireless device. The second signal is unique for the first network node. The first probing pilot signal together the second signal enables identification of that the first network node is suitable to transmit data to the wireless device.

According to a third aspect, the object is achieved by a method in a wireless device for enabling transmission of data to the wireless device in a communications network which applies a combined cell deployment. The wireless device receives a first probing pilot signal from the first network node. The first probing pilot signal is unique for the first network node. The wireless device receives a second signal from the first network node. The second signal is unique for the first network node. The first probing pilot signal together with the second signal enables identification of that the first network node is suitable to transmit data to the wireless device.

According to a fourth aspect, the object is achieved by a method in a central network node for enabling transmission of data to a wireless device in a communications network which applies a combined cell deployment. The central network node is arranged to communicate with the wireless device and a first network node in the communications network. The central network node receives a first and second set of channel state parameters from the wireless device. Based on the received first and second set of channel state parameters, the central network node identifies that the first network node is suitable to transmit data to the wireless device since it is substantially close to the first network node. The central network node transmits information to the first network node (601), wherein the information comprises instructions that the first network node is suitable to transmit data to the wireless device.

According to a fifth aspect, the object is achieved by a communications network adapted to enable transmission of data to a wireless device. The communications network is adapted to apply a combined cell deployment. The communications network comprises a first network node, a wireless device and a central network node arranged to communicate with each other. The communications network is further adapted to transmit a first probing pilot signal from a first network node to the wireless device. The first probing pilot signal is unique for the first network node. The communications network is adapted to transmit a second signal from the first network node to the wireless device.

The second signal is unique for the first network node. The first probing pilot signal together the second signal enables identification of that the first network node is suitable to transmit data to the wireless device. The communications network is adapted to transmit a first and second set of channel state parameters from the wireless device to the central network node. The first and second set of channel state parameters are estimated by the wireless device based on the first probing pilot signal and the second signal. The communications network is further adapted to, based on the first and second set of channel state parameters, identify, at the central network node, that the first network node is suitable to transmit data to the wireless device since it is substantially close to the first network node.

According to a sixth aspect, the object is achieved by a first network node adapted to enable transmission of data to a wireless device in a communications network which applies a combined cell deployment. The first network node is further adapted to transmit a first probing pilot signal to the wireless device. The first probing pilot signal is unique for the first network node. The first network node is adapted to transmit a second signal to the wireless device. The second signal is unique for the first network node. The first probing pilot signal together the second signal enables identification of that the first network node is suitable to transmit data to the wireless device.

According to a sixth aspect, the object is achieved by a wireless device adapted to enable transmission of data to the wireless device in a communications network which applies a combined cell deployment. The wireless device is adapted to receive a first probing pilot signal from the first network node. The first probing pilot signal is unique for the first network node. The wireless device is adapted to receive a second signal from the first network node. The second signal is unique for the first network node. The first probing pilot signal together with the second signal enables identification of that the first network node is suitable to transmit data to the wireless device.

According to a seventh aspect, the object is achieved by a central network node adapted to enable transmission of data to a wireless device in a communications network which applies a combined cell deployment. The central network node is adapted to receive a first and second set of channel state parameters from the wireless device. The central network node is adapted to, based on the received first and second set of channel state parameters, identify that the first network node is suitable to transmit data to the wireless device since it is substantially close to the first network nod. The central network node is further adapted to transmit information to the first network node. The information comprises instructions that the first network node is suitable to transmit data to the wireless device.

Since the first probing pilot signal together with the other signal is sufficient to identify which network node is suitable for performing transmissions to a particular wireless device, utilization of resources in a communications network is improved.

Embodiments herein afford many advantages, of which a non-exhaustive list of examples follows:

An advantage of the embodiments herein may be that they provide spatial reuse gain for the communications network. Hence, the capacity of the communications network may be improved.

When one network node is assigned to transmit data to the wireless device, instead of transmitting the same signal from each node in the network, wastage of resources is reduced and it provides capacity benefits when the load of the combined cell is high.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to transmitting data in the downlink direction in a combined cell deployment when multiple antennas are deployed at all or in a subset of network nodes. The embodiments herein utilize spatial reuse with multiple network nodes and with multiple antennas in a network.

Figure 1:
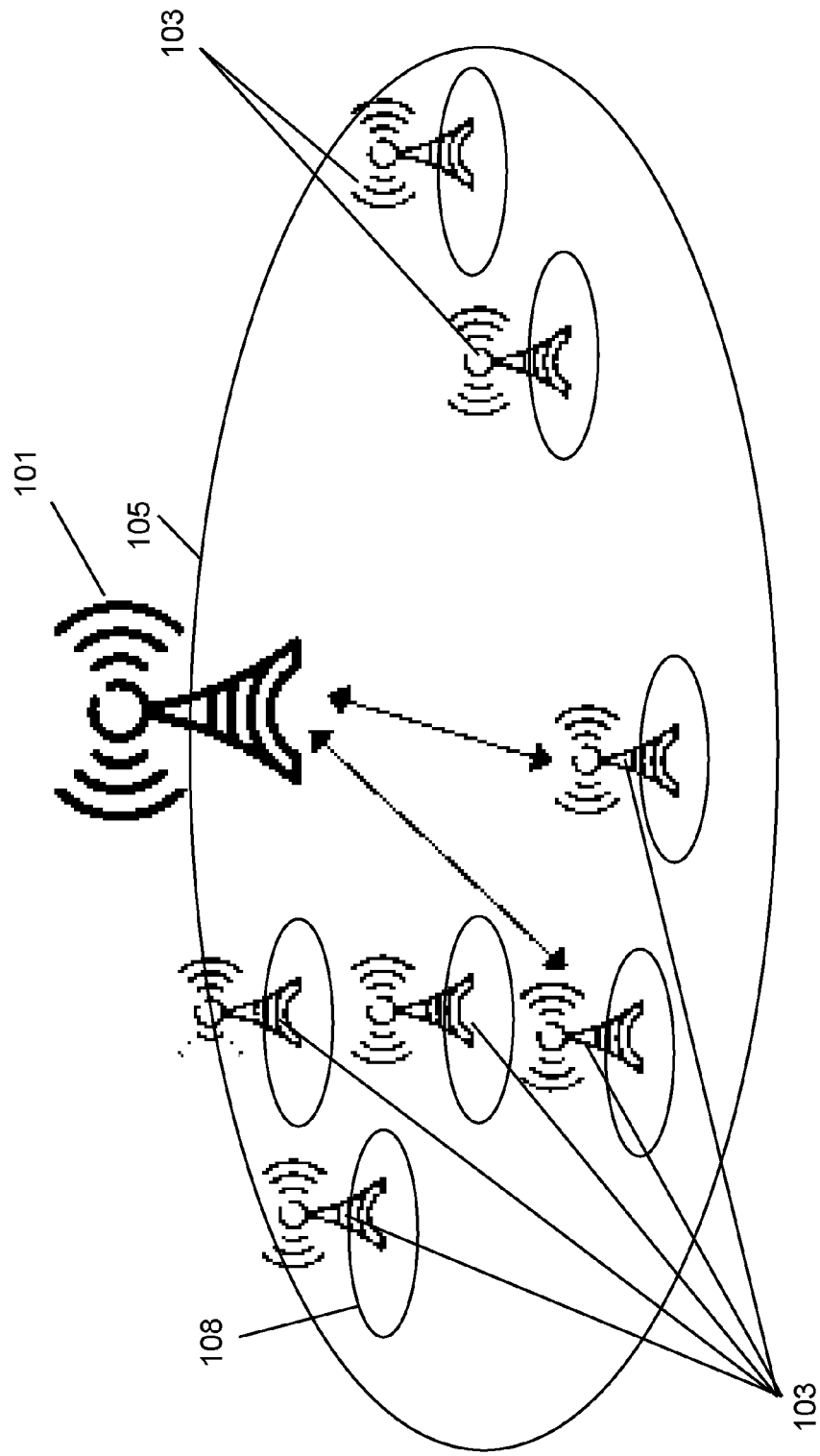
FIG. 1 is a schematic block diagram illustrating embodiments of deployment of low power network nodes in a heterogeneous network.
Figure 2:
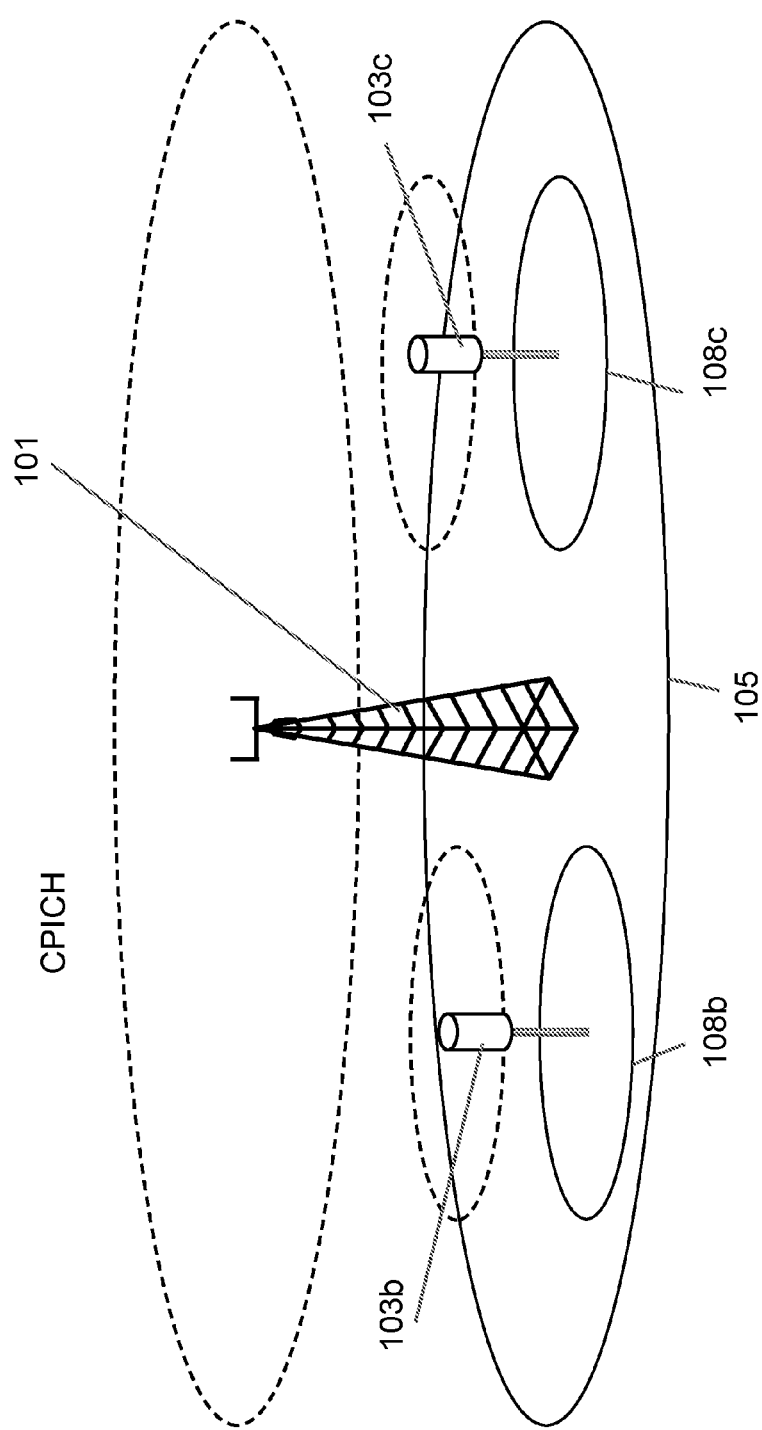
FIG. 2 is a schematic block diagram illustrating embodiments of low power network nodes having different cell ID in a heterogeneous network.
Figure 3:
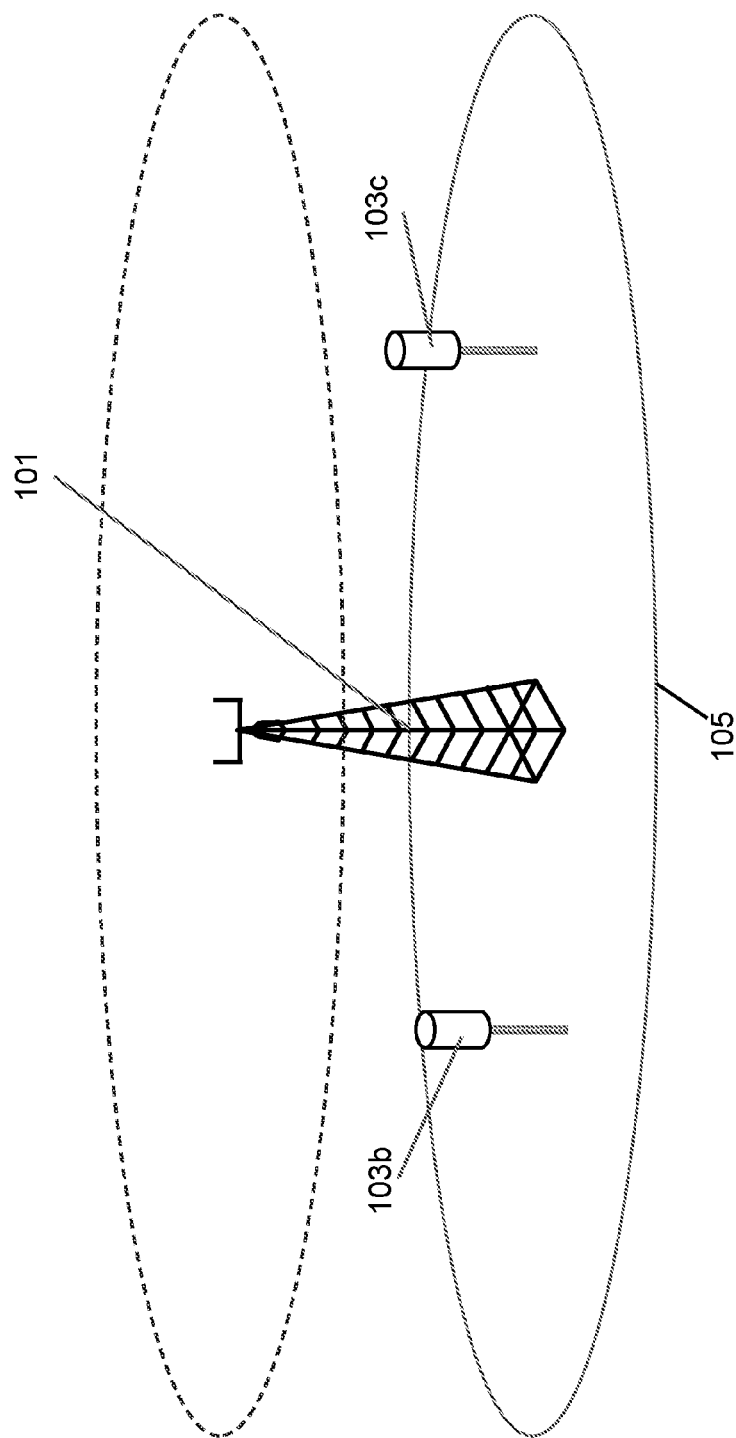
FIG. 3 is a schematic block diagram illustrating embodiments of low power network nodes as part of the macro cell, also called soft cell, in a heterogeneous network.
Figure 4:
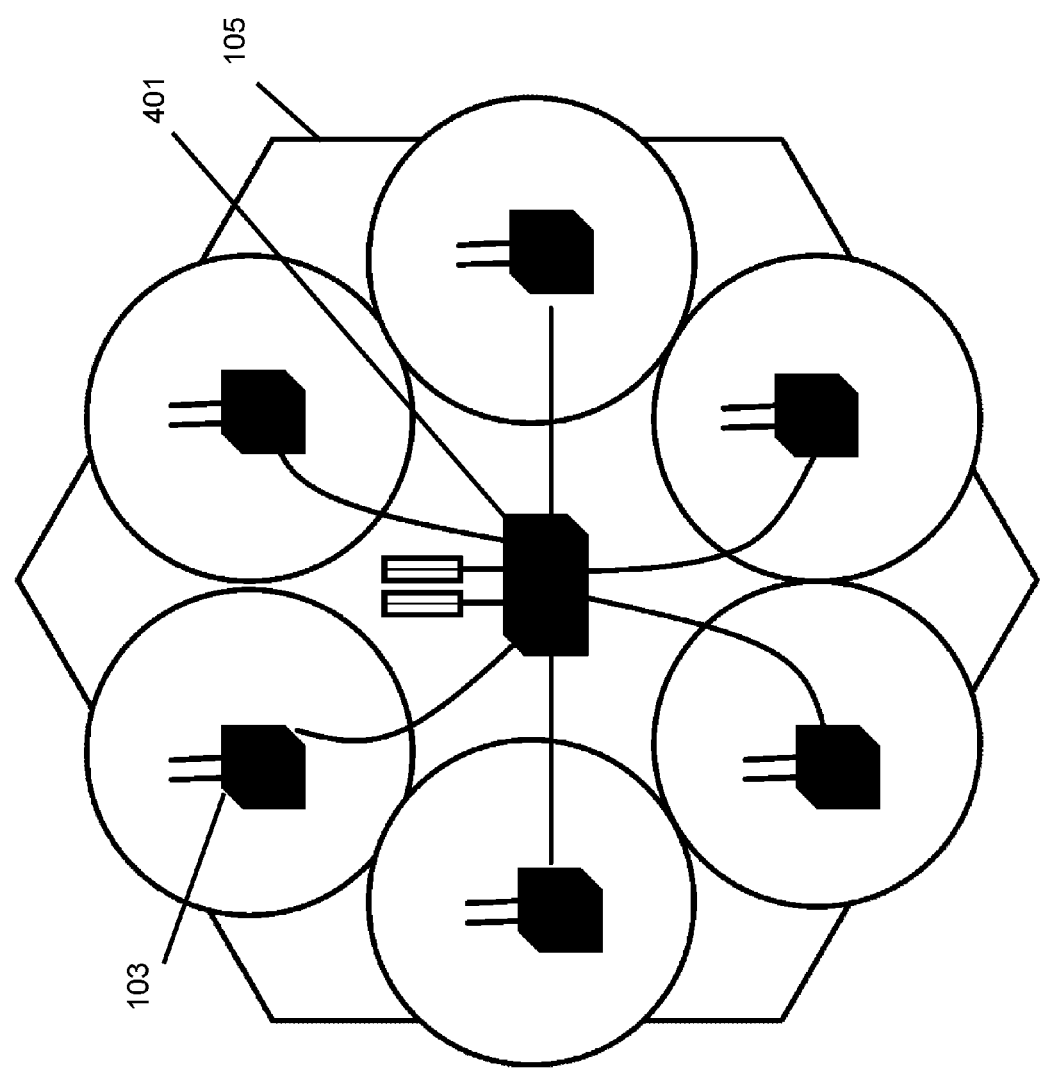
FIG. 4 is a schematic block diagram illustrating embodiments of a deployment scenario of a combined cell.
Figure 5:
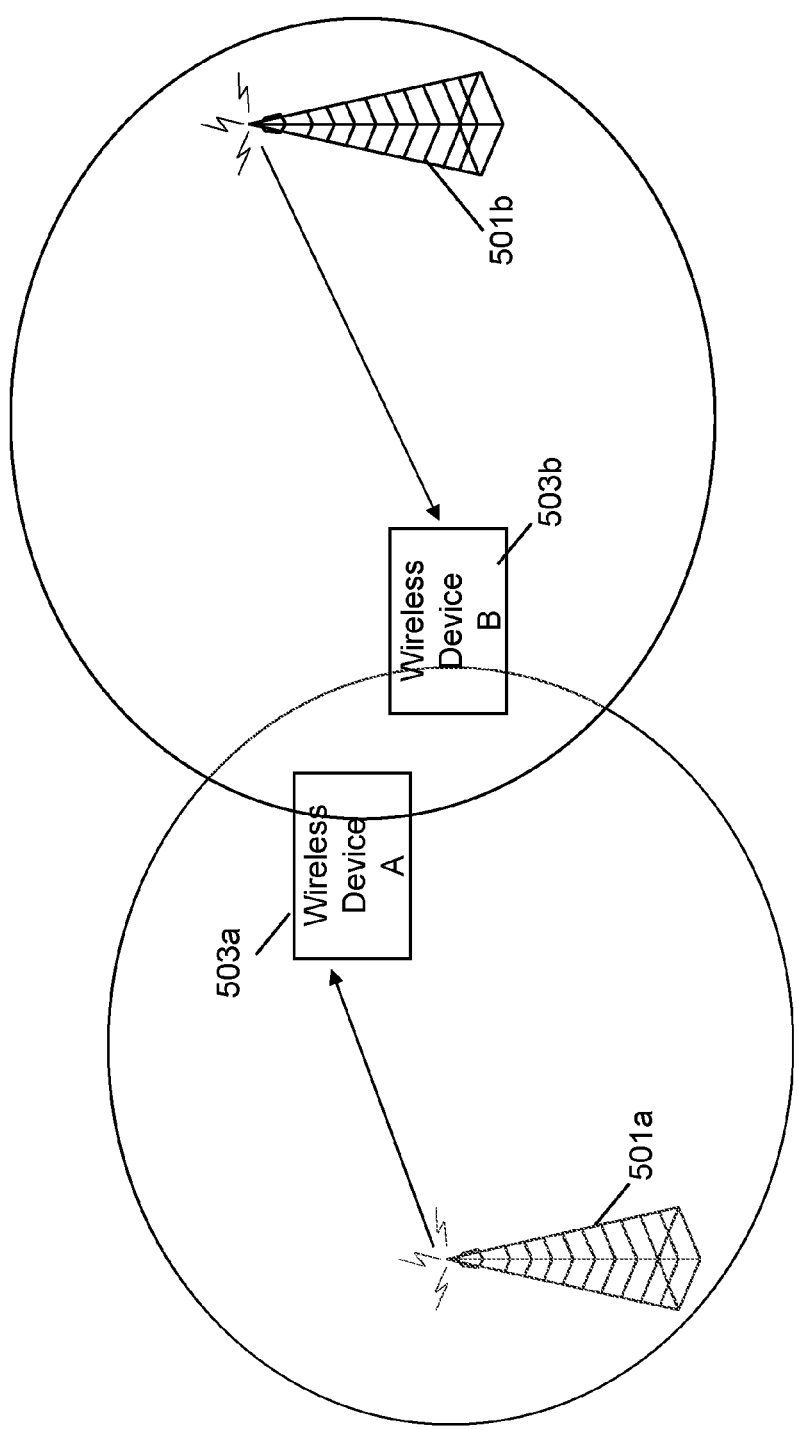
FIG. 5 is a schematic block diagram illustrating embodiments of spatial reuse in a combined cell deployment.
Figure 6:
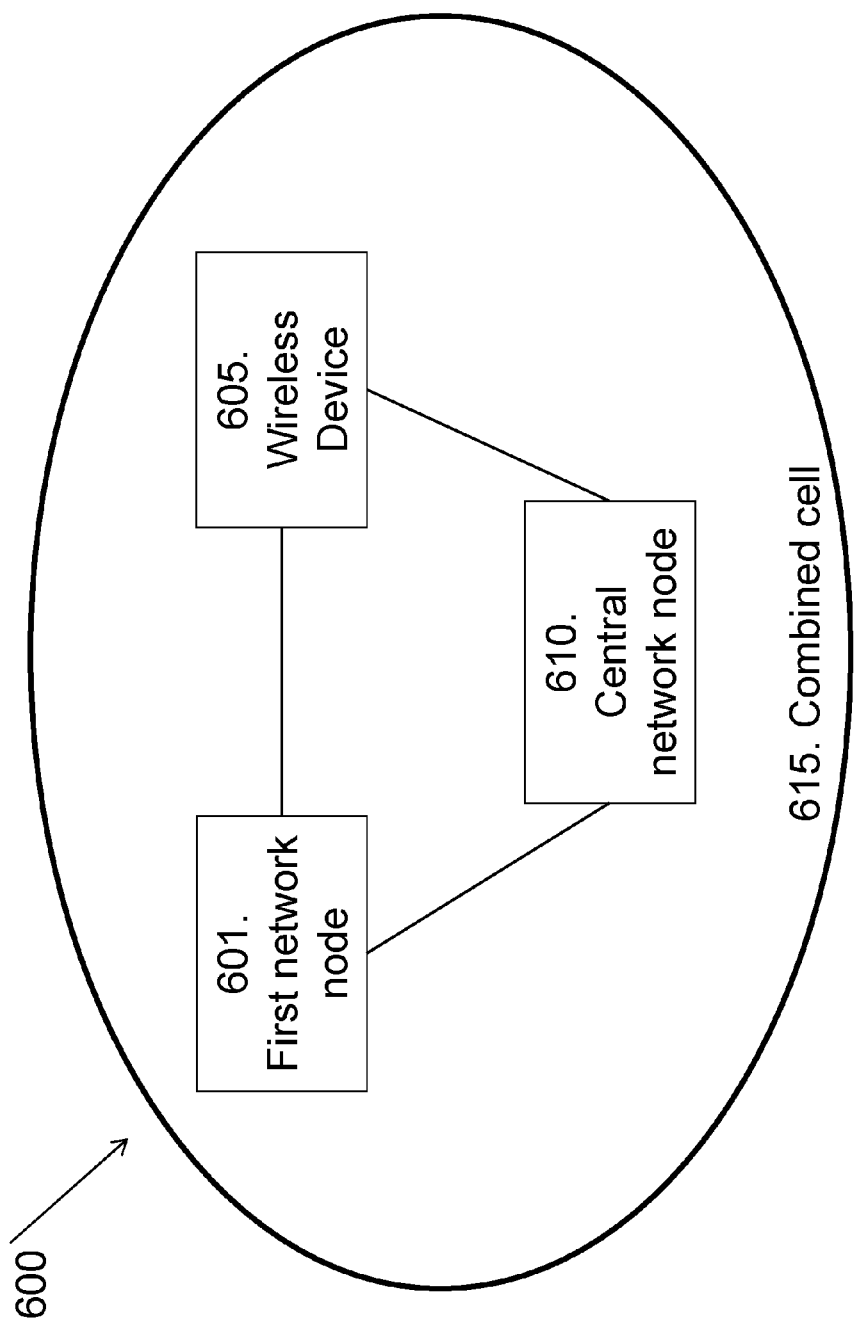
FIG. 6 is a schematic block diagram illustrating embodiments of a communications network.

FIG. 6 depicts a communications network 600 in which embodiments herein may be implemented. The communications network 600 may be a heterogeneous network which applies combined cell deployment. The communications network 600 also applies MIMO, e.g. four branch MIMO. The communications network 600 may in some embodiments apply to one or more radio access technologies such as for example LTE, LTE Advanced, WCDMA, HSPA, GSM, WiMAX, WiFi or any other 3GPP radio access technology, or other radio access technologies such as Wireless Local Area Network (WLAN).

The communications network 600 comprises a first network node 601. The first network node 601 may be a base station such as an eNB, NodeB, an eNodeB, or any other network unit capable to communicate with a wireless device 605. The first network node 601 may be represented by a node of any power. The first network node 601 and the wireless device 605 each comprise multiple antennas, i.e. transmit (Tx) and receipt (Rx) antennas. This may also be described as the first network node 601 and the wireless device 605 operating in MIMO mode.

The wireless device 605 may be a device by which a subscriber may access services offered by an operator's network and services outside operator's network to which the operators radio access network and core network provide access, e.g. access to the Internet. The wireless device 605 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Device to Device (D2D) device or any type of consumer electronic, for instance but not limited to television, radio, lighting arrangements, tablet computer, laptop or Personal Computer (PC). The wireless device 605 may be portable, pocket storable, hand held, computer comprised, or vehicle mounted devices, enabled to communicate voice and/or data, via the radio access network, with another entity, such as another wireless device or a server.

The communications network 600 further comprises a central network node 610 serving a combined cell 615. The first network node 601 is also part of the combined cell 615. The central network node 610 may also be referred to as a centralized controller, a central processing unit, a main network node, a central scheduler or a scheduler. The central network node 610 may be a node of any power. The central network node 610 may be an RNC, base station, eNB, NodeB, an eNodeB, or any other network unit capable to communicate with the wireless device 605 and the first network node 601. The central network node 610 in the combined cell 615 takes responsibility for collecting operational statistics information of network environment measurements. The cooperation among various network nodes is instructed by the central network node 610 and implemented in a centralized way.

It should be noted that the communication links in the communications network 600 may be of any suitable kind including either a wired or wireless link. The links may use any suitable protocol depending on type and level of layer, e.g. as indicated by the Open Systems Interconnection (OSI) model, as understood by the person skilled in the art.

Even though FIG. 6 shows only one first network node 601 and only one wireless device 605, the embodiments herein are equally applicable to a communications network 600 comprising any other number of first network nodes and wireless devices or other nodes (not shown), as understood by the skilled person.

Some terms which will be used below will now be described. A pilot signal may also be referred to as a reference signal and is a signal known to both the transmitter and the receiver used, e.g., for the purpose of channel estimation. That is, as the receiver knows the (pilot/reference) signal transmitted it can calculate the channel from this and the received signal. A pilot signal may be a probing pilot signal or a common pilot signal. A probing pilot signal may be described as a signal used to probe the channel and for the purpose of node selection, i.e., to estimate the channel with the purpose to select which node (port) to connect to. A common pilot signal may be described as a signal that all users can make use of (i.e., it is common to all wireless devices). The opposite is a dedicated pilot, which is dedicated to a certain user. A Fractional-Common Pilot Channel (F-CPICH) and a Secondary-Fractional-Common Pilot Channel (S-F-CPICH) may be seen as probing pilot signals. The S-CPICH and the P-CPICH may be seen as common pilot signals.

The method for transmitting data to a wireless device 605 in a combined cell deployment and applying MIMO mode, according to some embodiments will now be described with reference to the signaling diagram depicted in FIG. 7. In the embodiments described in FIG. 7, the first network node 601 transmits either one or two probing pilot signals. Both the first network node 601 and the wireless device 605 may operate in MIMO mode. The method comprises the following steps, which steps may as well be carried out in another suitable order than described below.

Step 701

The first network node 601 transmits a first probing signal to the wireless device 605. The first probing signal may be an F-CPICH. The first network node 601 therefore transmits an F-CPICH to the wireless device 605. The F-CPICH being the first probing signal is unique for the first network node 601. The F-CPICH comprises at least one of a spreading code and a scrambling code. The scrambling code is a primary scrambling code or a secondary scrambling code of the combined cell. The F-CPICH may be transmitted from the primary/first antenna of the first network node 601.

Step 702

The first network node 601 transmits a second signal to the wireless device 605. The second signal is unique for the first network node 601.

In one embodiment, the second signal is an S-CPICH which is unique for the first network node. This embodiment is referred to as embodiment I below. In such embodiments, the S-CPICH is unique for the first network node 601. Only one probing pilot signal is transmitted from the first network node 601 to the wireless device 605 in such embodiment, i.e. the first probing pilot signal. In this embodiment, there are two sets of pilot signals: a first set comprising the first probing pilot signal, e.g. F-CPICH, and the second signal, S-CPICH, and a second set comprising the primary common pilot, P-CPICH, and the secondary common pilot, S-CPICH.

In another embodiment, the second signal is a Secondary-F-CPICH (S-F-CPICH) signal. This embodiment is referred to as embodiment II below. The S-F-CPICH is a continuous pilot signal which may be transmitted from the second antenna of the first network node 601. The F-CPICH and the S-F-CPICH may each be referred to as a probing signal where the F-CPICH is a first probing signal and the S-F-CPICH is a second probing signal. The F-CPICH and the S-F-CPICH are two different unique probing pilots for the first network node. In other words, the first network node 601 transmits two probing pilot signals to the wireless device 605 in this embodiment. In this embodiment, the first set comprises two probing pilot signals and a secondary common pilot, i.e. the F-CPICH, the S-F-CPICH and the S-CPICH. The second set comprises the primary common pilot, i.e. the P-CPICH, and the secondary common pilot, i.e. the S-CPICH.

In the embodiment where the second signal is the S-F-CPICH, i.e. the first network node 601 transmits multiple probing pilot signals, the first network node 601 transmits the S-CPICH which in this embodiment is common for all network nodes in the communications network 600 and not unique for the first network node 601 as in embodiment I. The S-CPICH is a secondary common pilot signal in this embodiment.

The S-CPICH may therefore either be unique for the first network node 601 (in case of one probing pilot signal) or it may be common for all network nodes in the communications network 600 (in case of multiple probing pilot signals).

Thus, the first network node 601 transmits one or two probing signals to the wireless device 605, the F-CPICH only or the F-CPICH and the S-F-CPICH. In some embodiments, there may be further F-CPICHs than the F-CPICH and the S-F-CPICH.

Embodiment I and II will be described in more detail with reference to FIGS. 8 and 9 below.

Step 703

In some embodiments, the first network node 601 transmits a P-CPICH to the wireless device 605. The P-CPICH is a signal which is common for all network nodes 601 and wireless devices 605 in the communications network 600 in such embodiments. The P-CPICH is always fixed and cannot be changed. The P-CPICH may be transmitted from a first antenna of the first network node 601. Even though FIG. 6 only shows one network node 601 and one wireless device 605, the communications network 600 may comprise any other number of network nodes 601 and wireless devices 605 other than shown in FIG. 6.

The first probing pilot signal, the second signal, the P-CPICH and the S-CPICH may be transmitted in any suitable order than the order described above.

Step 704

The wireless device 605 estimates a first set of channel state parameters based on the first probing signal and the second signal. This may also be described as estimating the channel.

In case of embodiment I, the first set of channel state parameters may be based on the F-CPICH and the S-CPICH. In embodiment II, the first set of channel state parameters may be based on the F-CPICH and the S-F-CPICH.

The F-CPICH and the S-CPICH are necessary for MIMO transmission. Two common pilot signals may be necessary for MIMO channel estimation. The number of necessary common pilot signals may be depend on e.g. the number of antennas (transmit) or the number of layers.

The channel state parameters may be at least one of a Channel Quality Information/Indicator (CQI), Rank Information (RI), the number of transport blocks preferred and Precoding Control Index (PCI). In some embodiments, the CQI may implicitly indicate RI and PCI. CQI is a channel state parameter which indicates the actual status of the channel quality. In some embodiments, the rank information is referred to as number of transport blocks preferred, and indicates the number of layers and the number of different signal streams transmitted in the downlink. PCI provides precoding vector information.

Step 705

The wireless device 605 estimates a second set of channel state parameters based on the P-CPICH and the S-CPICH. This may also be described as estimating the channel. This step 705 is performed regardless of whether the S-CPICH is unique for the first network node 601 or if it is common for all network nodes in the communications network 600, i.e. regardless of whether there are one or multiple probing pilot signals (embodiment I or embodiment II).

The channel state parameters may be at least one of a CQI, rank information, number of transport blocks preferred and PCI. In some embodiments, the CQI may implicitly indicate rank information, number of transport blocks preferred and PCI.

After steps 704 and 705 have been performed, channel state parameters associated with the two sets channel state parameters at two time intervals exists.

Step 706

In some embodiments, the wireless device 605 time multiplexes the first and second set of channel state parameters. Multiplexing may be described as transmitting multiple signals or streams of information on a carrier at the same time in the form of a single, complex signal and then recovering the separate signals at the receiving end. In time multiplexing, the multiple signals are carried over the same channel in alternating time slots.

Step 707

The wireless device 605 transmits information indicating the first and second sets of channel state parameters to the central network node 610 using an Uplink High Speed-Dedicated Physical Control Channel (HS-DPCCH). HS-DPCCH is an uplink feedback channel. This step also involves transmitting the information indicating the first and second sets of channel state parameters to all other network nodes in the communications network 600 in case there are more network nodes than the first network node 601 in the communications network 600, indicated with the longest arrow associated with step 708 in FIG. 7.

Step 708

This is an optional step. The central network node 610 determines whether to use only the first probing signal or to use both the first and the second probing signal. This decision may be based on the type of wireless device 605, i.e. whether or not it is a legacy wireless device. This may also be described as, based on type of wireless device 605, the central network node 610 determines whether to use only the F-CPICH or to use both the F-CPICH and the S-F-CPICH as probing pilot signals. The type of wireless device 605 may be a legacy wireless device or not a legacy wireless device. If there are no legacy wireless devices, the central network node 610 determines to use only the first probing signal, i.e. only the F-CPICH. If there are some legacy wireless devices in the communications network 600, the central network node 610 determines to use both the first probing pilot signal and the second probing pilot signal, i.e. both the F-CPICH and the S-F-CPICH. A legacy wireless device does not know that that the S-CPICH exists.

This may be described as the central network node 610 takes a decision based on the type population of wireless device. If there is a large fraction of wireless devices which are MIMO capable, one of these wireless devices may be selected here. If there are very few wireless devices which are MIMO capable, the central network node 610 may determine to use a single probing signal. So, the decision may be based the capabilities of all served wireless devices.

Step 708 is only performed in case the first network node 601 transmits both the first probing pilot signal and the second probing pilot signal, i.e. when the S-CPICH transmitted in step 702 is common for all network nodes in the communications network 600. The step 708 is not performed in the case where the first network node 601 only transmits the first probing pilot signal, i.e. when the S-CPICH transmitted in step 702 is a signal which is unique for the first network node 601.

In some embodiments, this step 708 is performed by a Radio Network Controller (RNC) instead of the central network node 610. If the RNC performs this step, it transmits information indicating its decision to the central network node 610. A RNC is a network node which is responsible for controlling the network nodes that are connected to it. The RNC carries out e.g. radio resource management, some of the mobility management functions and is the point where encryption is done before user data is sent to and from the wireless device.

Hence, either the central network node 610 or the RNC may dynamically switch between these embodiments (using the F-CPICH or using both the F-CPICH and the S-F-CPICH) based on the wireless device population, i.e., based on the number of the legacy wireless devices in the combined cell.

Step 709

Based on the first and second sets of channel state parameters, the central network node 610 identifies which network node which is substantially close to, in short distance, to the wireless device 605. It may be the network node which is actually the node which is geographically located closest to the wireless device 605, or it may be the network node which is geographically substantially closest to the wireless device 605 and which fulfills a certain other suitable criteria.

If there are more network nodes than the first network node 601 in the communications network 600, the central network node 610 has received channel state parameters from all network nodes. In order to identify which network node is substantially closest to the wireless device 605, the central network node 610 processes the received signal from all network nodes. For example the central network node 610 may compute the maximum spectral efficiency preferred with each network node, where the spectral efficiency preferred may be computed as follows:

Spectral efficiency preferred=the number of bits*code rate*number of transport blocks preferred.

The central network node 610 also uses the channel state parameters information for assigning the modulation, transport blocks, channelization codes, precoding index and the rank information for each Transmission Time Interval (TTI). TTI refers to the duration of a transmission on the radio link, and the TTI is related to the size of the data blocks passed from the higher network layers to the radio link layer. A TTI may be for example 2 ms, 10 ms, 20 ms, 40 ms, or 80 ms.

Step 710

In the case that the central network node 610 has determined that it is the first network node 601 is the node which is substantially close to the wireless device 605, the central network node 610 transmits information comprising instructions to the first network node that it is suitable to transmit data to wireless device 605. Thus, the first network node 601 knows that it is assigned to transmit to the wireless device 605.

Step 711

In some embodiments, the first network node 601 which is assigned to transmit to the wireless device 605, transmits the two demodulation pilot channel signals (e.g. the D-CPICH and the S-D-CPICH), a downlink control channel signal (e.g. the HS-SCCH signal) and the downlink traffic channel signal (e.g. the HS-PDSCH signal) to the respective wireless device 605. Note that the D-CPICH and the S-DPCH are used for estimating the channel for data demodulation. This is necessary for the first network node 601 to be able to transmit data to the wireless device 605.

D-CPICH, short for Demodulation Common Pilot Channel, has an arbitrary channelization code of SF=256, a D-CPICH is scrambled by the primary scrambling code see. There may be zero or two D-CPICH per cell. A D-CPICH shall be transmitted over the entire cell. D-CPICH carries a predefined bit sequence. A D-CPICH is non-precoded and is transmitted from the third or fourth transmit antenna. The wireless device for which the two D-CPICHs are activated may assume that the D-CPICHs are present in the HS-DSCH TTIs in which the wireless device 605 is scheduled to receive HS-PDSCHs. S-D-CPICH is a secondary D-CPICH.

HS-SCCH, short for High Speed-Shared Control Channel, is a fixed rate (60 kbps, SF=128) downlink physical channel used to carry downlink signaling related to HS-DSCH transmission.

HS-PDSCH, short for High Speed-Physical Downlink Shared CHannel, is used to carry the High Speed Downlink Shared Channel (HS-DSCH). A HS-PDSCH corresponds to one channelization code of fixed spreading factor SF=16 from the set of channelization codes reserved for HS-DSCH transmission.

Step 712

The central network node 610 transmits instructions to other network node(s) in the communications network 600 to transmit data to other wireless device(s) than the wireless device 605.

Step 713

The first network node 601 transmits data to the wireless data as instructed by the central network node 610 in step 710.

Below, two embodiments for enabling transmission of data to a wireless device 605 in a communications network 600 which applies a combined cell deployment will be described with reference to FIGS. 8 and 9. FIG. 8 illustrates embodiment I where only one probing pilot signal is used, i.e. the first probing pilot signal. FIG. 9 illustrates embodiment II where two probing pilot signals are used, i.e. the first and second probing pilot signal.

Embodiment I

The method for transmitting data to a wireless device 605 in a combined cell deployment and applying MIMO mode will now be described with reference to the signaling diagram depicted in FIG. 8 using a single probing pilot per each network node and with different secondary common pilot per each network node 601. The embodiment seen in FIG. 8 is referred to as embodiment I. In embodiment I, the S-CPICH is unique for the first network node 601. FIG. 8 shows an example embodiment with a combined cell deployment comprising four network nodes 601, a first network node 601a, a second network node 601b, a third network node 601c and a fourth network node 601d. The four network nodes 601 serve multiple wireless devices 605. Only one wireless device 605 is shown in FIG. 8 for the sake of simplicity. However, the same procedure applies if the number of network nodes 601 is more than four or less than four. The method comprises the following steps, which steps may as well be carried out in another suitable order than described below:

Steps 801-804

Figure 7:
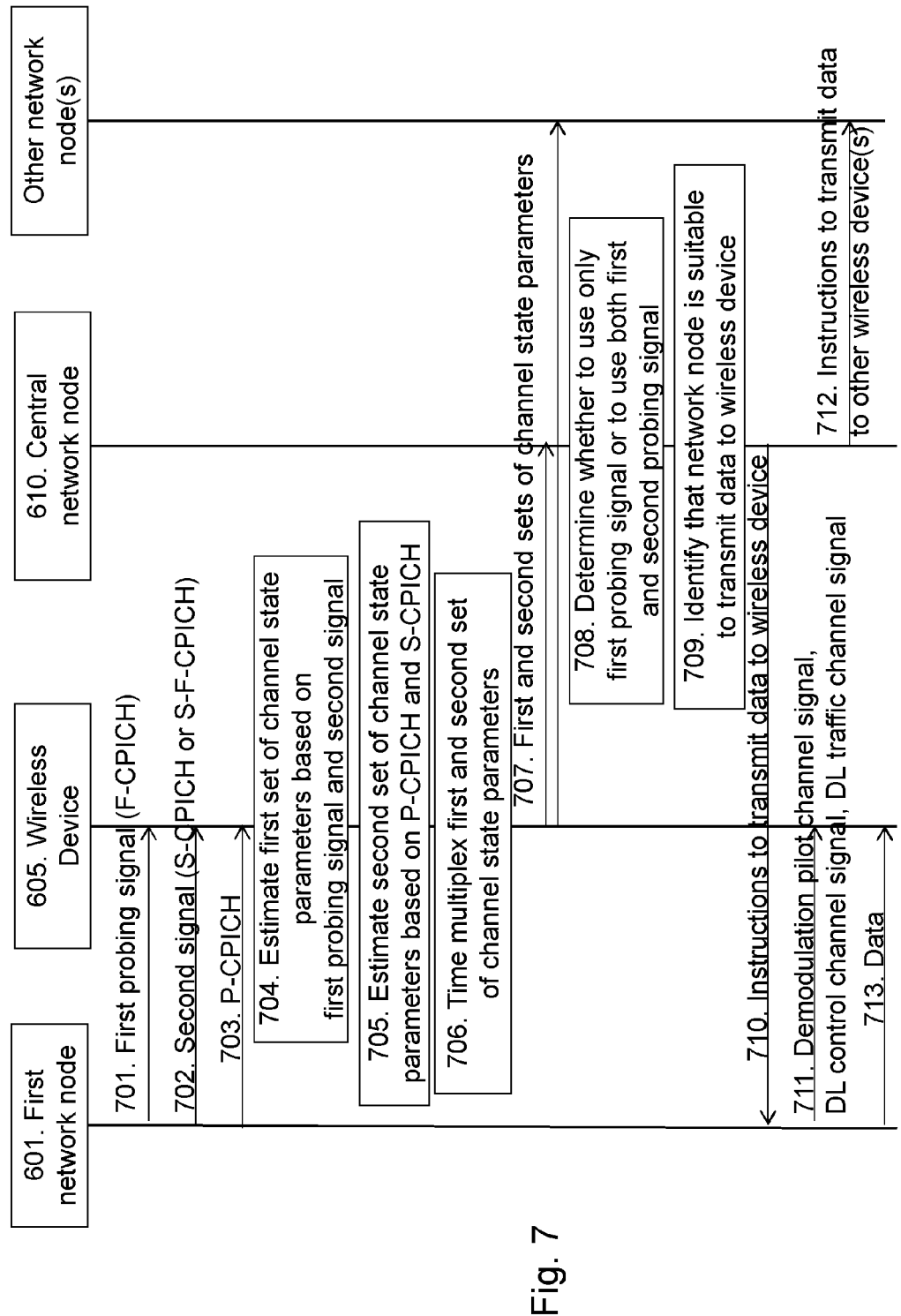
FIG. 7 is a signaling diagram illustrating embodiments of a method in a communications network.

These steps correspond to step 701 in FIG. 7. A reference signal which is unique to each network node in a combined cell called F-CPICH is transmitted from each network node simultaneously and continuously to the wireless device 605. The F-CPICH is the first probing pilot signal. The F-CPICH is characterized by a spreading code (for example Spreading Factor (SF)=256) and a scrambling code which is either the primary scrambling code or a secondary scrambling code of the combined cell. The F-CPICH channel power levels may be indicated to the wireless device 605 during the initial cell set up.

The first network node 601a transmits the F-CPICH_1 to the wireless device 605 in step 801. The second network node 601b transmits the F-CPICH_2 to the wireless device 605 in step 802. The third network node 601c transmits the F-CPICH_3 to the wireless device 605 in step 803. The fourth network node 601d transmits the F-CPICH_4 to the wireless device 605 in step 804.

Steps 805-808

These steps correspond to step 703 in FIG. 7. In addition to F-CPICH, the primary common pilot (P-CPICH) which is common to all the network nodes is continuously transmitted from the first antenna of each network node 601a, 601b, 601c, 601d to the wireless device 605.

The first network node 601a transmits the P-CPICH in step 805, the second network node 601b transmits the P-CPICH in step 806, the third network node 601c transmits the P-CPICH in step 807 and the fourth network node 601*d* transmits the P-CPICH in step 808.

Steps 809-812

These steps correspond to step 702 in FIG. 7. From the second antenna of each network node the S-CPICH is transmitted continuously to the wireless device 605. Note that in this embodiment I, each network node uses a different S-CPICH which may use either a different spreading code or scrambling code, or both as that of the main or other nodes. In other words, the S-CPICH is unique for each network node.

The first network node transmits an S-CPICH_1 to the wireless device 605 in step 809. The second network node transmits an S-CPICH_2 to the wireless device 605 in step 810. The third network node transmits an S-CPICH_3 to the wireless device 605 in step 811. The fourth network node transmits an S-CPICH_4 to the wireless device 605 in step 812.

The single probing pilot signal, i.e. F-CPICH, and the secondary common pilot, i.e. S-CPICH, for each of the respective network nodes is sufficient to identify which network node is suitable for a particular wireless device as shown below.

Figure 8:
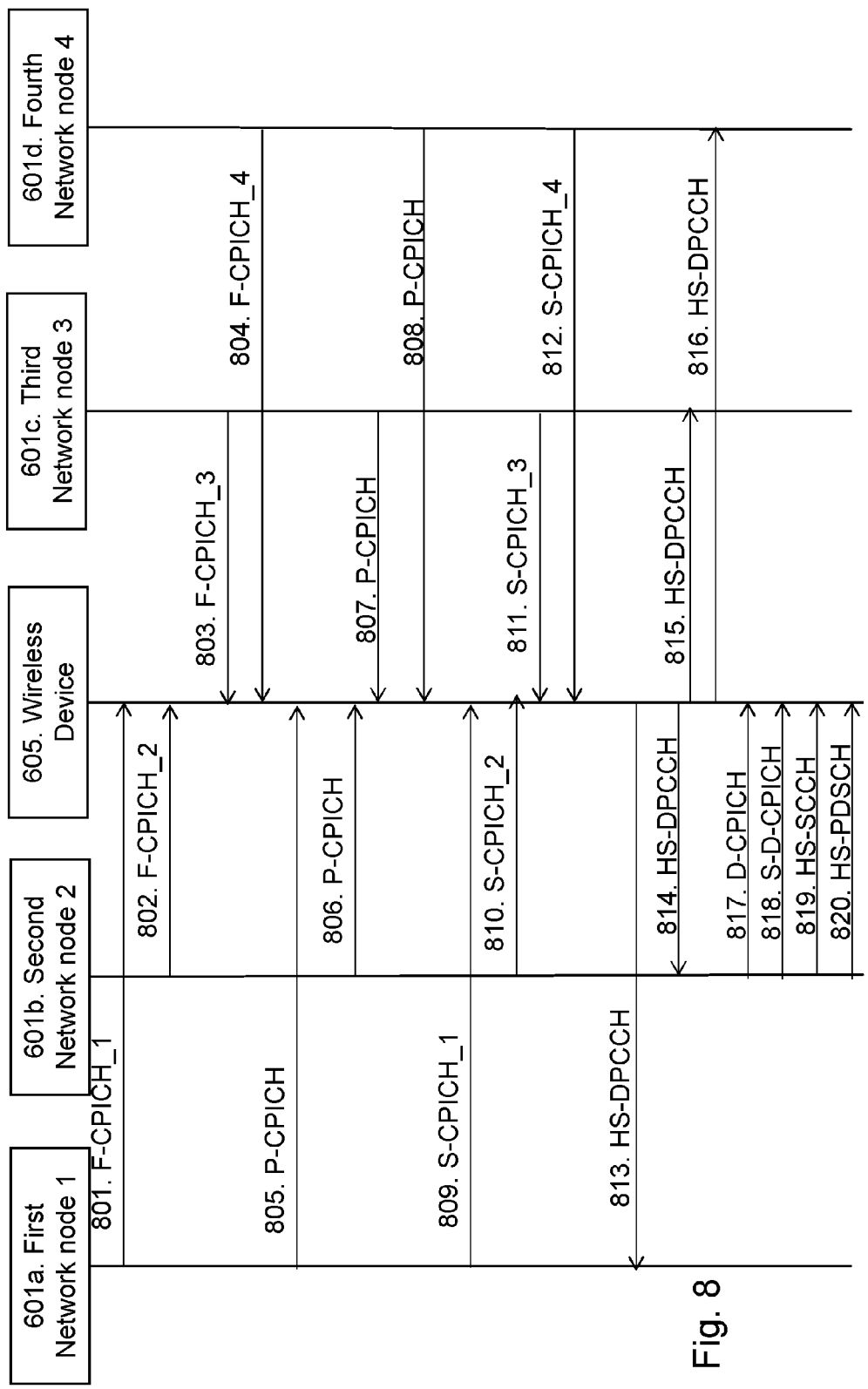
FIG. 8 is a signaling diagram illustrating embodiments of a method in a communications network.

After steps 801-812, the following is performed (corresponding to steps 704-706 in FIG. 7), but not illustrated in FIG. 8:

In this embodiment I, note that there are two sets of pilot signals. The first set comprises a probing pilot signal and secondary common pilot, i.e. F-CPICH and S-CPICH. The second set comprises the primary common pilot, P-CPICH, and the secondary common pilot, S-CPICH. From these two set of pilot signals, the wireless device 605 estimates a first and second set of channel state parameters and feeds back, to the central network node 610 the CQI, rank information or number of transport blocks preferred and the PCI associated with these two set of pilots at two time intervals.

From the first set of pilot signals the wireless device 605 estimates the CQI using the F-CPICH & S-CPICH. The estimated channel state parameters correspond to the specific node. The channel state parameters for embodiment I are hereafter referred to as CQI_F, RI_F, PCI_F. The channel state parameters computed using P-CPICH & S-CPICH is the channel quality using the combined nodes, referred to hereafter as called CQI_P, RI_P, PCI_P. These two set of channel state parameters are time multiplexed.

Steps 813-816

These steps correspond to steps 707-709 in FIG. 7. The multiplexed sets of channel state parameters are sent on the uplink feedback channel HS-DPCCH to the central network node 610 (not shown). The same HS-DPCCH signal is received by all the network nodes in the communications network 600. The central network node 610 processes the received signal (HS-DPCCH) from all the nodes.

The first network node 601*a* receives on the HS-DPCCH in step 813, the second network node 601*b* receives on the HS-DPCCH in step 814, the third network node 601*c* receives on the HS-DPCCH in step 815 and the fourth network node 601*d* receives on the HS-DPCCH in step 816.

From CQI_F, RI_F, the central network node 610 identifies which network node the wireless device 605 is substantially close to. In FIG. 8, it is the second network node 601*b* which is close to the wireless device 605. For example it may compute the maximum spectral efficiency preferred with each network node. The spectral efficiency preferred may be computed as follows:

Spectral efficiency preferred=the number of bits*code rate*number of transport blocks preferred Spectral efficiency may also be referred to as spectrum efficiency or bandwidth efficiency. Spectral efficiency may be described as the information rate that may be transmitted over a given bandwidth in a specific communication network. It may be seen as a measure of how efficiently a limited frequency spectrum is utilized by the physical layer protocol, and sometimes by the media access control.

Note that the CQI_F indicates the number of bits and the code rate preferred. Hence the central network node 610 informs the respective network node, e.g. second network node 601*b*, to transmit to the wireless device 605.

Steps 817-820

These steps correspond to steps 711 and 712 in FIG. 7. The assigned second network node 601*b* transmits the two demodulation pilot channel (D-CPICH and S-D-CPICH), downlink control channel (HS-SCCH) and the downlink traffic channel (HS-PDSCH) to the respective UE. Note that D-CPICH and S-DPCIH are used for estimating the channel for data demodulation. Similarly, the central network node 610 informs the other network nodes to transmit to the other wireless device(s) (corresponding to step 712 in FIG. 7). The central network node 610 uses the information of CQI_P, RI_P, PCI_P for assigning the modulation, transport blocks, channelization codes, precoding index and the rank information for each TTI. When the second network node 601 has received instructions that it is assigned to transmit data to the wireless device 605, it transmit the data as instructed.

The second network node 601*b* transmits the D-CPICH in step 817, the S-D-CPICH in step 818, the HS-SCCH in step 819 and the HS-PDSCH in step 820.

Embodiment II

The method for transmitting data to a wireless device 605 in a combined cell deployment and applying MIMO mode will now be described with reference to the signaling diagram depicted in FIG. 9 using multiple probing pilots per each network node and with the same secondary common pilot per each network node 601. In this embodiment, the S-CPICH is common for all network nodes, i.e. it is not unique. The embodiment seen in FIG. 9 is referred to as embodiment II. Similar to FIG. 8, it is assumed that a combined cell deployment consists of four network nodes 601*a*, 601*b*, 601*c*, 601*d* serving multiple wireless devices. The same procedure applies if the number of network nodes is more than four or less than four.

Steps 901-908

These steps correspond to step 701 in FIG. 7. Instead of a single probing pilot as in embodiment I, multiple probing pilots are used from each network node. In FIG. 9, each network node sends two probing pilots, a first probing pilot signal and a second probing pilot signal, i.e. F-CPICH and S-F-CPICH, to the wireless device 605. The second probing pilot signal is the second signal in FIG. 7. However, each network node may a send any other suitable number of probing pilots other than two.

The first network node 601*a* transmits F-CPICH_1 and S-F-CPICH_1 to the wireless device 605 in steps 901 and 902. The second network node 601*b* transmits F-CPICH_2 and S-F-CPICH_2 to the wireless device 605 in steps 903 and 904. The third network node 601*c* transmits F-CPICH_3 and S-F-CPICH_3 to the wireless device 605 in steps 905 and 906. The fourth network node 601*d* transmits F-CPICH_4 and S-F-CPICH_4 to the wireless device 605 in steps 907 and 908.

Steps 909-912

These steps correspond to step 703 in FIG. 7. In addition to the multiple probing pilots, all the network nodes transmit the same P-CPICH to the wireless device 605.

The first network node 601a transmits the P-CPICH to the wireless device 605 in step 909, the second network node 601b transmits the P-CPICH to the wireless device 605 in step 910, the third network node 601c transmits the P-CPICH to the wireless device 605 in step 911 and the third network node 601d transmits the P-CPICH to the wireless device 605 in step 912.

Steps 913-916

The same secondary common pilot, S-CPICH is transmitted from each network node 601 to the wireless device 605. In this embodiment II, the S-CPICH is common for all network nodes. This is different from embodiment I where the S-CPICH is unique for each network node.

The first network node 601a transmits the S-CPICH to the wireless device i step 913, the second network node 601b transmits the S-CPICH to the wireless device i step 914, the third network node 601c transmits the S-CPICH to the wireless device i step 915 and the fourth network node 601d transmits the S-CPICH to the wireless device i step 916.

Figure 9:
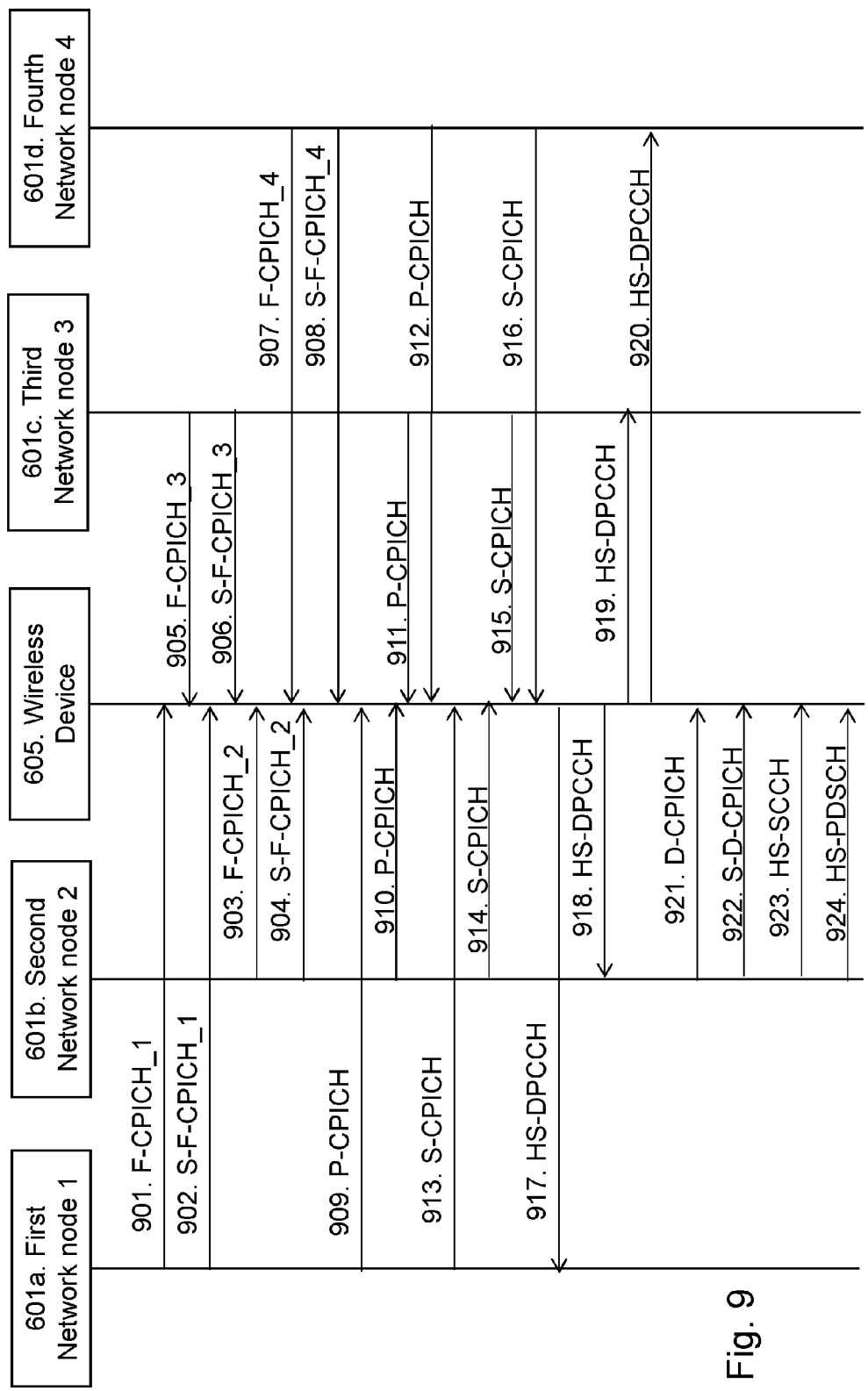
FIG. 9 is a signaling diagram illustrating embodiments of a method in a communications network.

After steps 901-916, the following is performed (corresponding to steps 704-706 in FIG. 7), but not illustrated in FIG. 9:

Note that there are two sets of pilot signals. The first set comprises two probing pilots and a secondary common pilot, i.e. F-CPICH, S-F-CPICH and S-CPICH. The second set comprises the primary common pilot, P-CPICH, and the secondary common pilot, S-CPICH. From these two set of pilot signals, the wireless device 605 estimates the channel and feeds back, to the central network node 610 the CQI, rank information or number of transport blocks preferred and the PCI associated with these two set of pilots at two time intervals.

From the first set of pilot signals the wireless device 605 estimates the CQI using the F-CPICH, S-F-CPICH and S-CPICH. The estimated channel state parameters correspond to the specific node. The channel state parameters for embodiment II are referred to hereafter as CQI_F, RI_F, PCI_F. The channel state parameters computed using P-CPICH & S-CPICH is the channel quality using the combined nodes, referred to hereafter as called CQI_P, RI_P, PCI_P. These two set of channel state parameters are time multiplexed.

Steps 917-920

These steps are similar to step 707-709 in FIG. 7 and steps 813-816 in FIG. 8. The multiplexed sets of channel state parameters are sent on the uplink feedback channel HS-DPCCH to the central network node 610 (not shown). The same HS-DPCCH signal is received by all the network nodes in the communications network 600.

The first network node 601a receives on the HS-DPCCH in step 917, the second network node 601b receives on the HS-DPCCH in step 918, the third network node 601c receives on the HS-DPCCH in step 919 and the fourth network node 601d receives on the HS-DPCCH in step 920.

The central network node 610 processes the received signal (HS-DPCCH) from all the nodes. From CQI_F, RI_F the central network node 610 identifies which network node the wireless device 605 is close to. For example it may compute the maximum spectral efficiency preferred with each network node. The spectral efficiency preferred may be computed as follows:

Spectral efficiency preferred=the number of bits*code rate*number of transport blocks preferred Note that the CQI_F indicates the number of bits and the code rate preferred. Hence the central network node 610 informs the respective network node, e.g. second network node 601b, to transmit to the wireless device 605.

Steps 921-924

These steps correspond to steps 711 and 712 in FIG. 7 and are similar to steps 817-820 in FIG. 8. The assigned second network node 601b transmits the two demodulation pilot channel (D-CPICH and S-D-CPICH), downlink control channel (HS-SCCH) and the downlink traffic channel (HS-PDSCH) to the respective wireless device 605. Note that D-CPICH and S-DPCIH are used for estimating the channel for data demodulation. Similarly, the central network node 610 informs the other network nodes to transmit to the other wireless device(s) (corresponding to step 712 in FIG. 7). The central network node 610 uses the information of CQI_P, RI_P, PCI_P for assigning the modulation, transport blocks, channelization codes, precoding index and the rank information for each TTI.

The second network node 601b transmits the D-CPICH in step 921, the S-D-CPICH in step 922, the HS-SCCH in step 923 and the HS-PDSCH in step 924.

Embodiment I may require less number of pilot signals as the secondary common pilot, i.e. S-CPICH, is used for both probing and for channel sounding. While embodiment II requires a larger number of pilot signals, i.e. two probing pilot signals F-CPICH and S-F-CPICH. However, an advantage of embodiment II is it may support legacy wireless devices (pre Release-12) which are MIMO capable. On the other hand, embodiment I might impact the legacy MIMO wireless devices. Hence, the network (either the central network node 610 or an RNC) may dynamically switches between embodiment I and II based on the wireless device 605 population, i.e., based on the number of the legacy wireless devices 605 in the combined cell.

Figure 10:
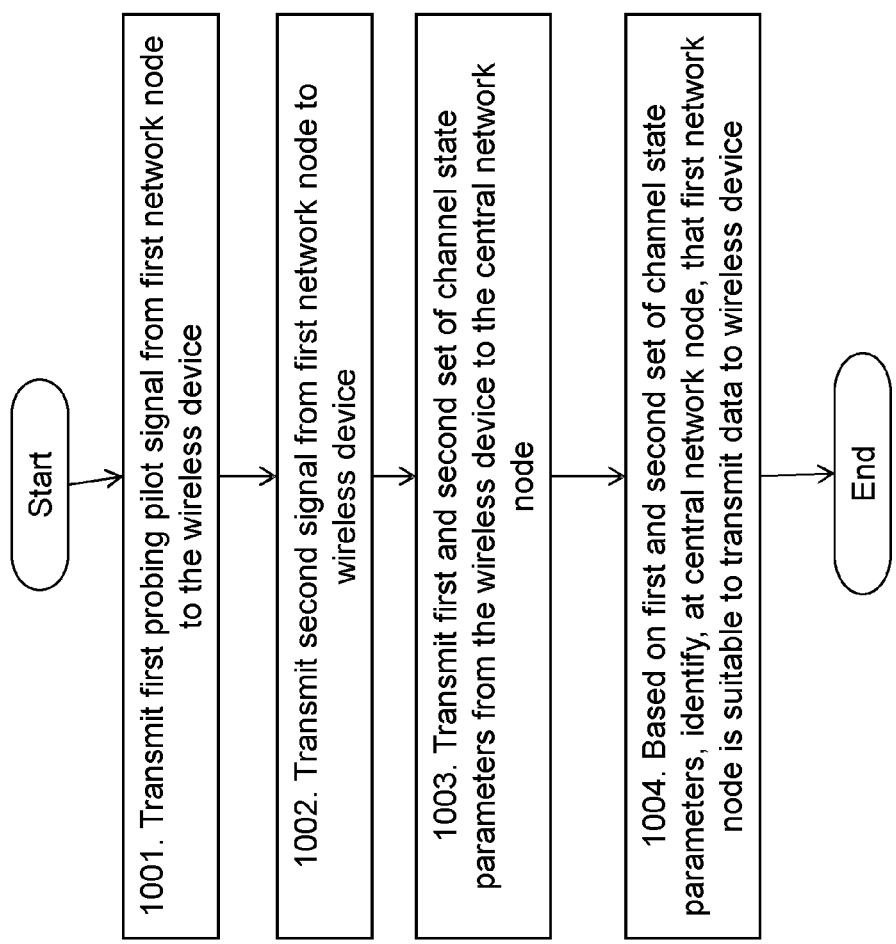
FIG. 10 is a flow chart illustrating embodiments of a method in a communications network.

The method described above will now be described seen from the perspective of the communications network 600. FIG. 10 is a flowchart describing the present method in the communications network 600, for enabling transmission of data to a wireless device 605. As mentioned above, the communications network 600 applies a combined cell deployment, and the communications network 600 comprises the first network node 601, the wireless device 605 and the central network node 610 arranged to communicate with each other. The method comprises the following steps to be performed by the communications network 600, which steps may be performed in any other suitable order than described below:

Step 1001

This step corresponds to step 701 in FIG. 7, steps 801, 802, 803 and 804 in FIG. 8 and steps 901, 903, 905 and 907 in FIG. 9.

The communications network 600 transmits the first probing pilot signal from the first network node 601 to the wireless device 605. The first probing pilot signal is unique for the first network node 601.

Step 1002

This step corresponds to step 702 in FIG. 7, steps 809, 810, 811 and 812 in FIG. 8 and steps 902, 904, 906 and 908 in FIG. 9.

The communications network 600 transmits the second signal from the first network node 601 to the wireless device 605. The second signal is unique for the first network node 601. The first probing pilot signal together the second signal enables identification of that the first network node 601 is suitable to transmit data to the wireless device 605.

Step 1003

This step corresponds to step 707 in FIG. 7, steps 813, 814, 815 and 816 in FIG. 8 and steps 917, 918, 919 and 920 in FIG. 9.

The communications network 600 transmits the first and second set of channel state parameters from the wireless device 605 to the central network node 610. The first and second set of channel state parameters are estimated by the wireless device 605 based on the first probing pilot signal and the second signal.

Step 1004

This step corresponds to step 709 in FIG. 7.

Based on the first and second set of channel state parameters, the communications network 600 identifies, at the central network node 610, that the first network node 601 is suitable to transmit data to the wireless device 605 since it is substantially close to the first network node 601.

Figure 11:
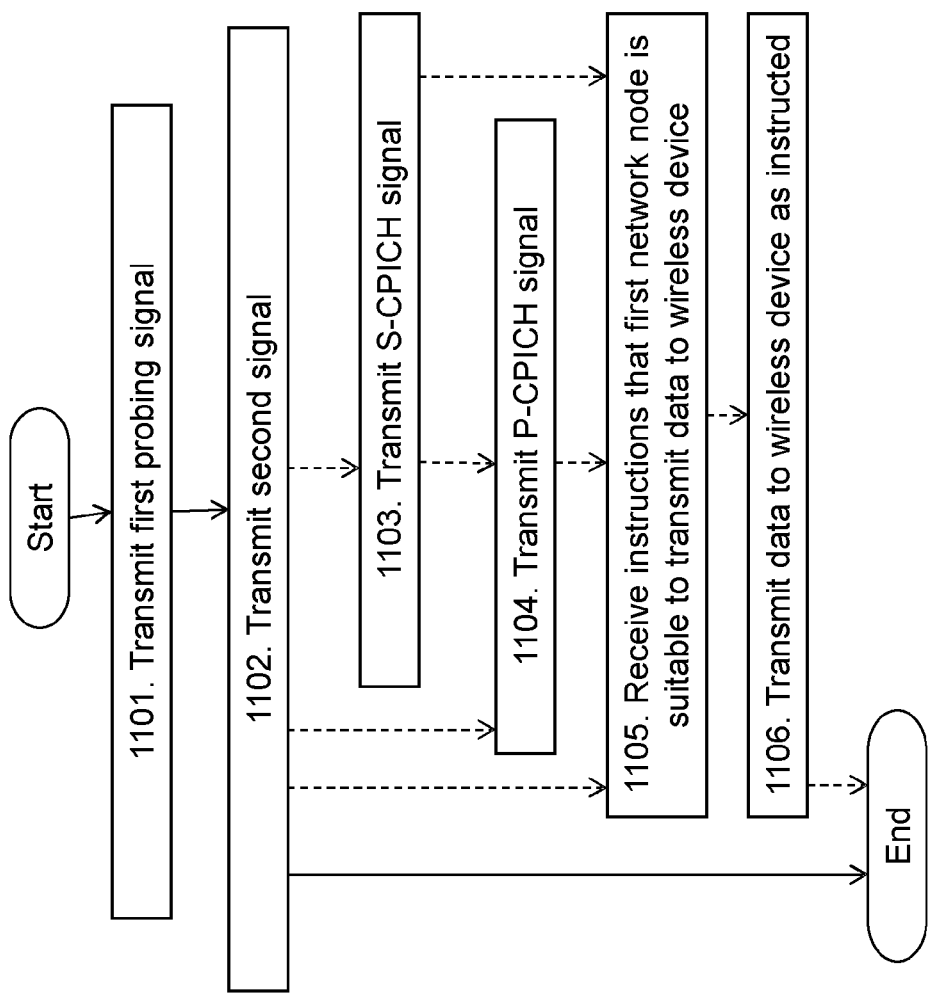
FIG. 11 is a flow chart illustrating embodiments of a method in a first network node.

The method described above will now be described seen from the perspective of the first network node 601. FIG. 11 is a flowchart describing the present method in the first network node 601 for enabling transmission of data to a wireless device 605 in a communications network 600 which applies a combined cell deployment. The optional steps in FIG. 11 are indicated with dotted arrows. The method comprises the following steps to be performed by the first network node 601, which steps may be performed in any other suitable order than described below:

Step 1101

This step corresponds to step 701 in FIG. 7, steps 801, 802, 803 and 804 in FIG. 8, steps 901, 903, 905 and 907 in FIG. 9 and step 1001 in FIG. 10.

The first network node 601 transmits the first probing pilot signal to the wireless device 605. The first probing pilot signal is unique for the first network node 601. The first probing pilot signal may be the F-CPICH.

Step 1102

This step corresponds to step 702 in FIG. 7, steps 809, 810, 811 and 812 in FIG. 8, steps 902, 904, 906 and 908 in FIG. 9 and step 1002 in FIG. 10.

The first network node 601 transmits the second signal to the wireless device 605. The second signal is unique for the first network node 601. The first probing pilot signal together the second signal enables identification of that the first network node 601 is suitable to transmit data to the wireless device 605.

In some embodiments, the second signal is the second probing pilot signal when the first network node 601 transmits multiple probing pilot signals. The first probing pilot signal and the second probing pilot signal are two different unique probing pilot signals for the first network node 601 in these embodiments. The second probing pilot signal may be the S-F-CPICH.

In some embodiments, the second signal is the S-CPICH when the first network node 601 transmits a single probing pilot signal.

In some embodiments, a first set of pilot signals comprises the F-CPICH and the S-CPICH when the first network node 601 transmits a single probing pilot signal. In other embodiments, the first set of pilot signals comprises the F-CPICH and the S-F-CPICH when the first network node 601 transmits multiple probing pilot signals. A second set of pilot signals may comprise the P-CPICH and the S-CPICH.

Step 1103

This step corresponds to steps 913, 914, 915 and 916 in FIG. 9.

In some embodiments, when the first network node 601 transmits multiple probing pilot signals, the first network node 601 transmits the S-CPICH to the wireless device 605. The S-CPICH is common for all network nodes in the communications network 600 in these embodiments.

Step 1104

This step corresponds to step 703 in FIG. 7, steps 805, 806, 807 and 808 in FIG. 8 and steps 909, 910, 911 and 912 in FIG. 9.

In some embodiments, the first network node 601 transmits the P-CPICH to the wireless device 605. The P-CPICH is common for all network nodes in the communications network 600.

Step 1105

This step corresponds to step 710 in FIG. 7.

In some embodiments, the first network node 601 receives information from a central network node 610, which information comprises instructions that the first network node 601 is suitable to transmit data to the wireless device since it is identified to be substantially close to the wireless device 605.

Step 1105

This step corresponds to step 713 in FIG. 7.

In some embodiments, the first network node 601 transmits data to the wireless device 605 as instructed by the central network node 610.

Figure 12:
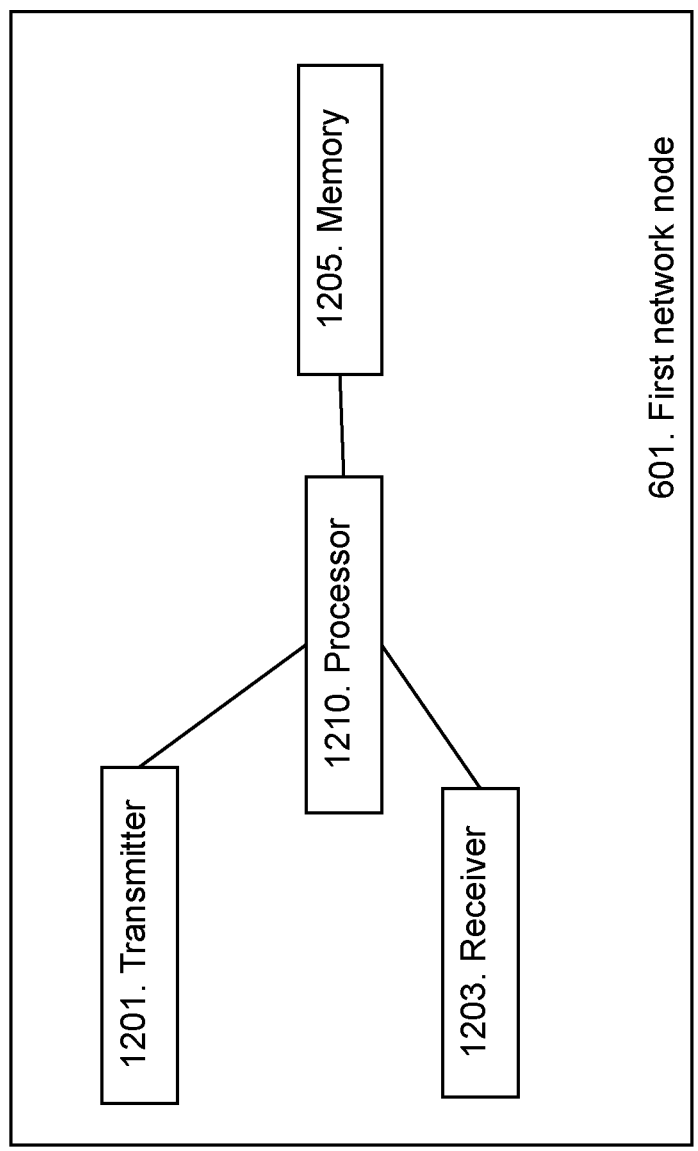
FIG. 12 is a schematic block diagram illustrating embodiments of a first network node.

To perform the method steps shown in FIG. 11 for enabling transmission of data to the wireless device 605 in the communications network 600 which applies a combined cell deployment, the first network node 601 comprises an arrangement as shown in FIG. 12. The first network node 601 is adapted to enable transmission of data to a wireless device 605 in the communications network 600 which applies a combined cell deployment. The first network node 601 and the wireless device 605 are both adapted to operate in MIMO mode.

The first network node 601 being further adapted to transmit a first probing pilot signal to the wireless device 605. The first probing pilot signal is unique for the first network node 601. The first probing pilot signal may be the F-CPICH. The transmission may be performed by a transmitter 1201 comprised in the first network node 601. The transmitter 1201 may also be referred to as a transmitting unit, transmitting circuit, transmitting means or transmitting module.

The first network node 601 is further adapted to transmit the second signal to the wireless device 605 wherein the second signal is unique for the first network node 601. This transmission may be performed by the transmitter 1201. The first probing pilot signal together the second signal enables identification of that the first network node 601 is suitable to transmit data to the wireless device 605.

In some embodiments, the second signal is the second probing pilot signal when the first network node 601 is adapted to transmit multiple probing pilot signals. The first probing pilot signal and the second probing pilot signal are two different unique probing pilot signals for the first network node 601. The second probing pilot signal may be the S-F-CPICH.

In some embodiments, the second signal is the S-CPICH when the first network node 601 is adapted to transmit a single probing pilot signal.

In some embodiments, the first set of pilot signals comprises the F-CPICH and the S-CPICH when the first network node 601 is adapted to transmit a single probing pilot signal. In some embodiments, the first set of pilot signals comprises the F-CPICH and the S-F-CPICH when the first network node 601 is adapted to transmit multiple probing pilot signals. The second set of pilot signals comprises the P-CPICH and the S-CPICH.

The first network node 601 may be further adapted to, when the first network node 601 transmits multiple probing pilot signals, transmit the S-CPICH to the wireless device 605. In such embodiment, the S-CPICH is common for all network nodes in the communications network 600. The transmission of the S-CPICH may be performed by the transmitter 1201.

The first network node 601 may be further adapted to transmit the P-CPICH to the wireless device 605. The P-CPICH is common for all network nodes in the communications network 600. The transmission of the P-CPICH may be performed by the transmitter 1201.

The first network node 601 may be further adapted to receive information from a central network node 610. The information comprises instructions that the first network node 601 is suitable to transmit data to the wireless device since it is identified to be substantially close to the wireless device 605. The receipt of the information may be performed by a receiver 1203 comprised in the first network node 601. The receiver 1203 may also be referred to as a receiving unit, receiving circuit, receiving means or receiving module.

The first network node 601 may be further adapted to transmit data to the wireless device 605 as instructed by the central network node 610. The transmission of the data may be performed by the transmitter 1201.

The first network node 601 may further comprise a memory 1205 comprising one or more memory units. The memory 1105 is arranged to be used to store data, received data streams, power level measurements, CPICHs, channel quality parameters threshold values, time periods, configurations, schedulings, and applications to perform the methods herein when being executed in the first network node 601. The memory 1205 may also be referred to as a memory unit, memory circuit, memory means, memory module or computer usable medium. The memory 1205 may be an external or internal memory within the first network node 601.

Those skilled in the art will also appreciate that the receiver 1203 and the transmitter 1201 described above may refer to a combination of analog and digital circuits, and/or one or more processors configured with software and/or firmware, e.g. stored in a memory, that when executed by the one or more processors such as the processor 1210 perform as described above. The processor 1210 may also be referred to as a processor unit, processor circuit, processor means or processor module.

A computer program product or a computer program may be directly loadable into an internal memory of a digital computer within at least one entity of the first network node 601. The computer program product comprises software code portions for performing the method according to FIG. 11 described above when said product is run on a computer.

A computer program product or a computer program may be stored on a computer usable medium, wherein the computer program product comprises a computer readable program for causing a computer, within an entity in the first network node 601 to control an execution of the method as described with regards to FIG. 11 above.

Figure 13:
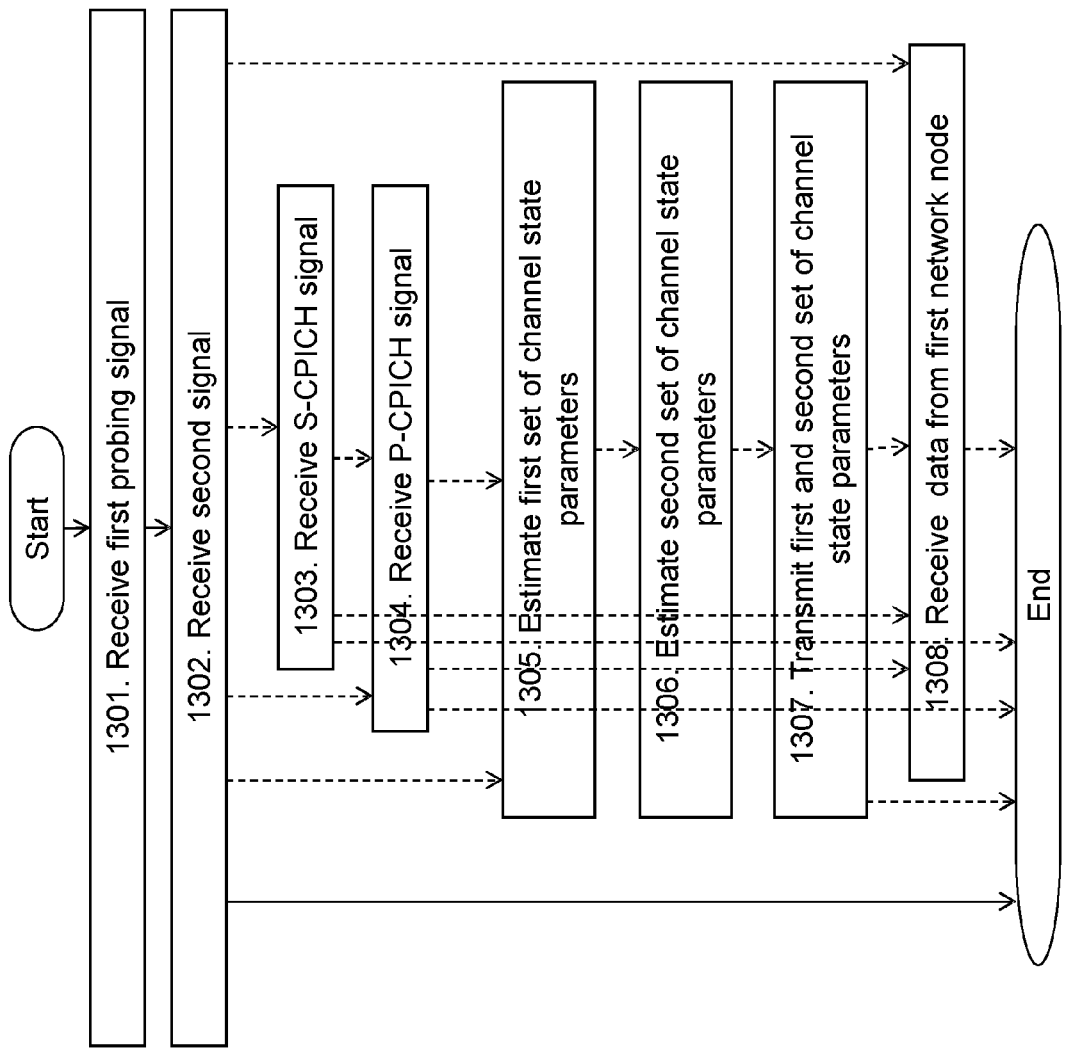
FIG. 13 is a flow chart illustrating embodiments of a method in a wireless device.

The method described above will now be described seen from the perspective of the wireless device 605. FIG. 13 is a flowchart describing the present method in the wireless device 605 for enabling transmission of data to the wireless device 605 in the communications network 600 which applies the combined cell deployment. The optional steps in FIG. 13 are indicated with dotted arrows. The method comprises the following steps to be performed by the wireless device 605, which steps may be performed in any other suitable order than described below:

Step 1301

This step corresponds to step 701 in FIG. 7, steps 801, 802, 803 and 804 in FIG. 8, steps 901, 903, 905 and 907 in FIG. 9 and step 1001 in FIG. 10.

The wireless device 605 receives the first probing pilot signal from the first network node 601. The first probing pilot signal is unique for the first network node 601. The first probing pilot signal may be the F-CPICH.

Step 1302

This step corresponds to step 702 in FIG. 7, steps 809, 810, 811 and 812 in FIG. 8, steps 902, 904, 906 and 908 in FIG. 8 and step 1002 in FIG. 10.

The wireless device 605 receives the second signal from the first network node 601. The second signal is unique for the first network node 601. The first probing pilot signal together with the second signal enables identification of that the first network node 601 is suitable to transmit data to the wireless device 605.

In some embodiments, the second signal is the second probing pilot signal when the wireless device 605 receives multiple probing pilot signals. The first probing pilot signal and the second probing pilot signal are two different unique probing pilot signals for the first network node 601 in these embodiments. The second probing pilot signal may be the S-F-CPICH.

In some embodiments, the second signal is an S-CPICH when the wireless device 605 receives a single probing pilot signal.

In some embodiments, a first set of pilot signals comprises the F-CPICH and the S-CPICH when the wireless device 605 receives a single probing pilot signal. In other embodiments, the first set of pilot signals comprises the F-CPICH and the S-F-CPICH when the wireless device 605 receives multiple probing pilot signals. The second set of pilot signals may comprise the P-CPICH and the S-CPICH.

Step 1303

This step corresponds to steps 913, 914, 915 and 916 in FIG. 9. In some embodiments, when the wireless device 605 receives multiple probing pilot signals, the wireless device 605 receives the S-CPICH from first network node 601. The S-CPICH is common for all network nodes in the communications network 600 in such embodiments.

Step 1304

This step corresponds to step 703 in FIG. 7, steps 805, 806, 807 and 808 in FIG. 8 and steps 909, 910, 911 and 912 in FIG. 9.

In some embodiments, the wireless device 605 receives the P-CPICH, signal from the first network node 601. The P-CPICH is common for all network nodes in the communications network 600.

Step 1305

This step corresponds to step 704 in FIG. 7.

In some embodiments, the wireless device 605 estimates a first set of channel state parameters based on the first probing signal and the second signal.

Step 1306

This step corresponds to step 705 in FIG. 7.

In some embodiments, the wireless device 605 estimates the second set of channel state parameters based on the P-CPICH and the S-CPICH.

Step 1307

This step corresponds to step 707 in FIG. 7, steps 813, 814, 815 and 816 in FIG. 8, steps 917, 918, 919 and 920 in FIG. 9 and step 1003 in FIG. 10.

In some embodiments, the wireless device 605 transmits the first and second set of channel state parameters to all network nodes in the communications network 600 and to a central network node 610.

Step 1308

This step corresponds to step 713 in FIG. 7.

In some embodiments, the wireless device 605 receives data from the first network node 601. The first network node 601 is suitable to transmit data to the wireless device 605.

Figure 14:
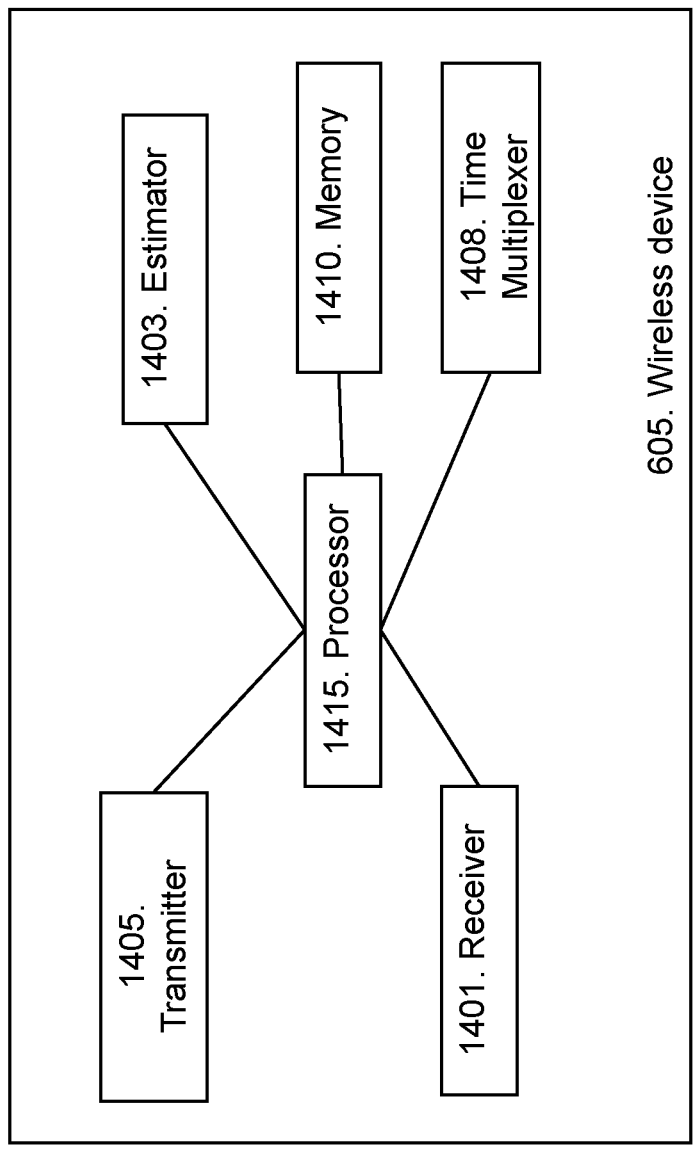
FIG. 14 is a schematic block diagram illustrating embodiments of a wireless device.

To perform the method steps shown in FIG. 13 for enabling transmission of data to the wireless device 605 in the communications network 600 which applies a combined cell deployment, the wireless device 605 comprises an arrangement as shown in FIG. 14. The wireless device 605 is adapted to enable transmission of data to the wireless device 605 in the communications network 600 which applies a combined cell deployment. The first network node 601 and the wireless device 605 are both adapted to operate in MIMO mode.

The wireless device 605 is adapted to receive a first probing pilot signal from the first network node 601. The first probing pilot signal is unique for the first network node 601. The receipt of the first probing pilot signal may be performed by a receiver 1401 comprised in the wireless device 605. The receiver 1401 may also be referred to as a receiving unit, receiving circuit, receiving means or receiving module. The first probing pilot signal may be the F-CPICH.

The wireless device 605 is further adapted to receive the second signal from the first network node 601. The second signal is unique for the first network node 601. The first probing pilot signal together with the second signal enables identification of that the first network node 601 is suitable to transmit data to the wireless device 605. The receipt of the second signal may be performed by the receiver 1401.

In some embodiments, the second signal is the second probing pilot signal when the wireless device 605 is adapted to receive multiple probing pilot signals. The first probing pilot signal and the second probing pilot signal are two different unique probing pilot signals for the first network node 601 in such embodiments. The second probing pilot signal may be the S-F-CPICH.

In some embodiments, the second signal is the S-CPICH, when the wireless device 605 is adapted to receive a single probing pilot signal.

The wireless device 605 may be further adapted to, when the wireless device 605 receives multiple probing pilot signals, receive the S-CPICH from first network node 601. The S-CPICH is common for all network nodes in the communications network 600. The receipt of the S-CPICH may be performed by the receiver 1401.

In some embodiments, the wireless device 605 is further adapted to receive a P-CPICH from the first network node 601. The P-CPICH is common for all network nodes in the communications network 600. The receipt of the P-CPICH may be performed by the receiver 1401.

In some embodiments, a first set of pilot signals comprises the F-CPICH and the S-CPICH when the wireless device 605 is adapted to receive a single probing pilot signal. In other embodiments, the first set of pilot signals comprises the F-CPICH and the S-F-CPICH when the wireless device 605 is adapted to receive multiple probing pilot signals. The second set of pilot signals comprises the P-CPICH and the S-CPICH.

The wireless device 605 may be further adapted to estimate a first set of channel state parameters based on the first probing signal and the second signal, and to estimate a second set of channel state parameters based on the P-CPICH and an S-CPICH. The estimation of the first and second set of channel state parameters may be performed by an estimator 1403 comprised in the wireless device 605. The estimator 1403 may also be referred to as an estimating unit, estimating circuit, estimating means or estimating module.

The wireless device 605 may be further adapted to transmit the first and second set of channel state parameters to all network nodes in the communications network 600 and to a central network node 610. The transmission of the first and second set of channel state parameters may be performed by a transmitter 1405 comprised in the wireless device 605. The transmitter 1405 may also be referred to as a transmitting unit, transmitting circuit, transmitting means or transmitting module.

The wireless device 605 may be further adapted to receive data from the first network node 601. The first network node 601 is suitable to transmit data to the wireless device 605. The receipt of the data may be performed by the receiver 1401.

The wireless device 605 may be further adapted to time multiplex the first and second set of channel state parameters. Multiplexing may be described as transmitting multiple signals or streams of information on a carrier at the same time in the form of a single, complex signal and then recovering the separate signals at the receiving end. In time multiplexing, the multiple signals are carried over the same channel in alternating time slots. The time multiplexing may be performed by a time multiplexer 1408 comprised in the wireless device 605. The time multiplexer 1408 may also be referred to as a time multiplexing unit, time multiplexing circuit, time multiplexing means or time multiplexing module.

The wireless device 605 may further comprise a memory 1410 comprising one or more memory units. The memory 1410 is arranged to be used to store data, received data streams, power level measurements, CPICHs, channel quality parameters threshold values, time periods, configurations, schedulings, and applications to perform the methods herein when being executed in the wireless device 605. The memory 1410 may also be referred to as a memory unit, memory circuit, memory means, memory module or computer usable medium.

Those skilled in the art will also appreciate that the receiver 1401, the estimator 1403, the transmitter 1405 and the time multiplexer 1408 described above may refer to a combination of analog and digital circuits, and/or one or more processors configured with software and/or firmware, e.g. stored in a memory, that when executed by the one or more processors such as the processor 1415 perform as described above with reference to FIG. 13. The processor 1415 may also be referred to as a processing unit, processing circuit, processing means or processing module.

A computer program product or a computer program may be directly loadable into an internal memory of a digital computer within at least one entity of the wireless device 605. The computer program product comprises software code portions for performing the method as described with reference to FIG. 13 when said product is run on a computer.

A computer program product or a computer program may be stored on a computer usable medium. The computer program product comprises a computer readable program for causing a computer, within an entity in the wireless device 605 to control an execution of the method as described with reference to FIG. 13.

Figure 15:
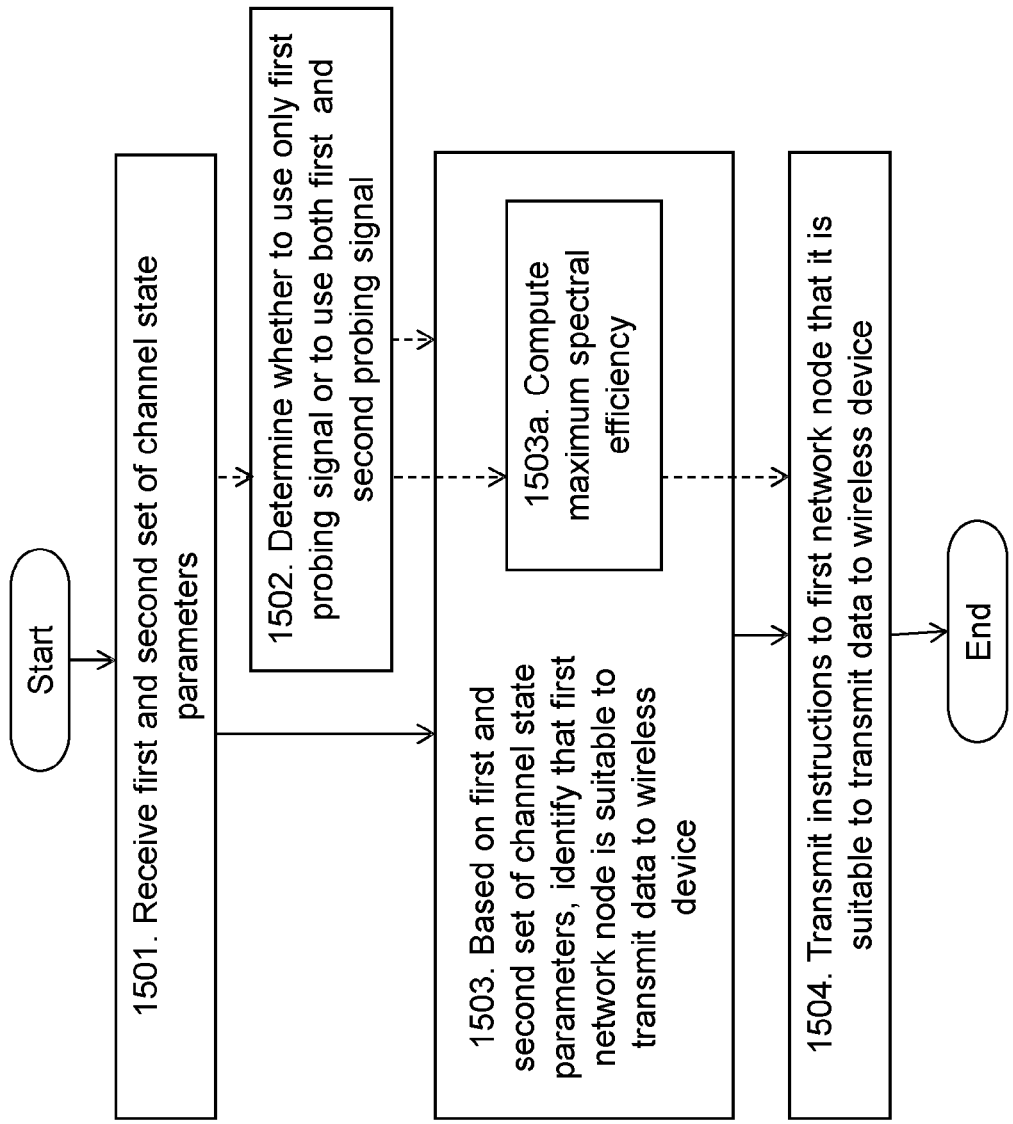
FIG. 15 is a flow chart illustrating embodiments of a method in a central network node.

The method described above will now be described seen from the perspective of the central network node 610. FIG. 15 is a flowchart describing the present method in the central network node 610 for enabling transmission of data to the wireless device 605 in the communications network 600 which applies the combined cell deployment. The optional steps in FIG. 15 are indicated with dotted arrows. The central network node 610 is arranged to communicate with the wireless device 605 and the first network node 601 in the communications network 600. The method comprises the following steps to be performed by the central network node 610, which steps may be performed in any other suitable order than described below:

Step 1501

This step corresponds to step 707 in FIG. 7, steps 813, 814, 815 and 816 in FIG. 8, steps 917, 918, 919 and 920 in FIG. 9 and step 1003 in FIG. 10.

The central network node 610 receives a first and second set of channel state parameters from the wireless device 605.

In some embodiments, the first set of channel state parameters is based on a first probing signal and the second signal transmitted from the first network node 601 to the wireless device 605. In some embodiments, the second set of channel state parameters is based on the P-CPICH and the S-CPICH, signal. The first probing pilot signal and the second signal may each be unique for the first network node 601. The first probing pilot signal together with the second signal enables identification of that the first network node 601 is suitable to transmit data to the wireless device 605.

In some embodiments, the second signal is a second probing pilot signal when the first network node 601 transmits multiple probing pilot signals. The first probing pilot signal and the second probing pilot signal are then two different unique probing pilot signals for the first network node 601. The first probing pilot signal together with the second probing pilot signal enables identification of that the first network node 601 is suitable to transmit data to the wireless device 605. The second probing pilot signal may be S-F-CPICH. The S-CPICH may be the same for all network nodes in the communications network 600 when the first network node 601 transmits multiple probing pilot signals.

In other embodiments, the second signal is the S-CPICH when the first network node 601 transmits a single probing pilot signal. The first probing pilot signal together with the S-CPICH then identifies that the first network node 601 is suitable to transmit data to the wireless device 605.

Step 1502

This step corresponds to step 708 in FIG. 7.

In some embodiments, based on a type of the wireless device 601, the central network node 610 determines whether to use only the first probing signal or to use the first probing signal and a second probing signal in the identifying of that the first network node 601 is suitable to transmit data to the wireless device 605.

Step 1503

This step corresponds to step 709 in FIG. 8 and step 1004 in FIG. 10.

Based on the received first and second set of channel state parameters, the central network node 610 identifies that the first network node 601 is suitable to transmit data to the wireless device 605 since it is substantially close to the first network node 601.

Step 1503a

This step corresponds to step 709 in FIG. 7. This step is a substep of step 1503.

In some embodiments, the central network node 610 computes a maximum spectral efficiency preferred for the first network node 601.

Step 1504

This step corresponds to step 710 in FIG. 7.

The central network node 610 transmits information to the first network node 601. The information comprises instructions that the first network node 601 is suitable to transmit data to the wireless device 605.

Figure 16:
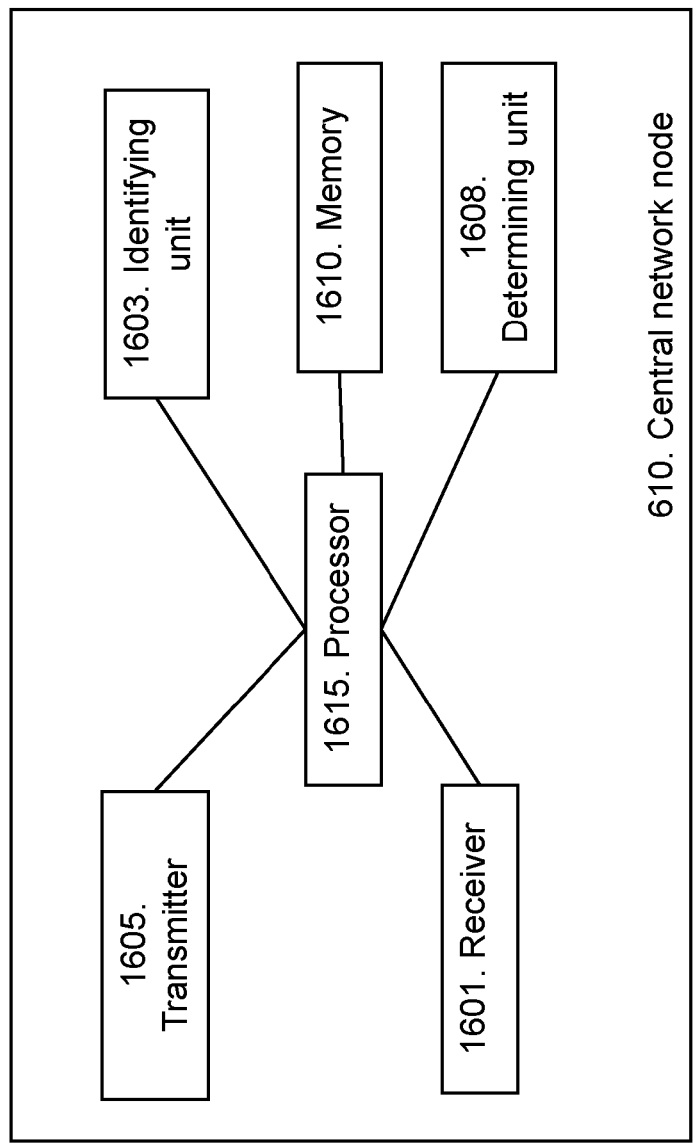
FIG. 16 is a schematic block diagram illustrating embodiments of a central network node.

To perform the method steps shown in FIG. 15 for enabling transmission of data to the wireless device 605 in the communications network 600 which applies a combined cell deployment, the central network node 610 comprises an arrangement as shown in FIG. 16. The central network node 610 is adapted to enable transmission of data to the wireless device 605 in the communications network 600 which applies a combined cell deployment.

The central network node 610 is adapted to receive a first and second set of channel state parameters from the wireless device 605. The receipt of the first and second set of channel state parameters may be performed by a receiver 1601 comprised in the central network node 610. The receiver 1601 may also be referred to as a receiving unit, receiving circuit, receiving means or receiving module.

The first set of channel state parameters may be based on a first probing signal and a second signal transmitted from the first network node 601 to the wireless device 605. The second set of channel state parameters may be based on the P-CPICH and the S-CPICH. The first probing pilot signal and the second signal are each unique for the first network node 601. The first probing pilot signal together with the second signal enables identification of that the first network node 601 is suitable to transmit data to the wireless device 605.

In some embodiments, the second signal is a second probing pilot signal when the first network node 601 is adapted to transmit multiple probing pilot signals. The first probing pilot signal and the second probing pilot signal are two different unique probing pilot signals for the first network node 601 in such embodiments. The first probing pilot signal together with the second probing pilot signal enables identification of that the first network node 601 is suitable to transmit data to the wireless device 605. The second probing pilot signal may be the S-F-CPICH. The S-CPICH may be the same for all network nodes in the communications network 600 when the first network node 601 is adapted to transmit multiple probing pilot signals.

In some embodiments, the second signal is the S-CPICH when the first network node 601 is adapted to transmit a single probing pilot signal. The first probing pilot signal together with the S-CPICH identifies that the first network node 601 is suitable to transmit data to the wireless device 605 in such embodiments.

The central network node 610 is further adapted to, based on the received first and second set of channel state parameters, identify that the first network node 601 is suitable to transmit data to the wireless device 605 since it is substantially close to the first network node 601. The identifying may be performed by an identifying unit 1603 comprised in the central network node 610. The identifying unit 1603 may also be referred to as an identifier, an identifying circuit, identifying means or identifying module.

In some embodiments, the central network node 610 is further adapted to compute a maximum spectral efficiency preferred for the first network node 601. The computing may be performed by the identifying unit 1603.

The central network node 610 is further adapted to transmit information to the first network node 601. The information comprises instructions that the first network node 601 is suitable to transmit data to the wireless device 605. The transmission of the information may be performed by a transmitter 1605 comprised in the central network node 610. The transmitter 1605 may also be referred to as a transmitting unit, a transmitting circuit, transmitting means or transmitting module.

In some embodiments, the central network node 610 is further adapted to, based on a type of the wireless device 601, determine whether to use only the first probing signal or to use the first probing signal and a second probing signal in the identifying of that the first network node 601 is suitable to transmit data to the wireless device 605. The determining may be performed by a determining unit 1608 comprised in the central network node 610. The determining unit 1608 may also be referred to as a determining circuit, determining means or determining module.

The central network node 610 may further comprise a memory 1610 comprising one or more memory units. The memory 1610 is arranged to be used to store data, received data streams, power level measurements, CPICHs, channel quality parameters threshold values, time periods, configurations, schedulings, and applications to perform the methods herein when being executed in the central network node 610. The memory 1610 may be an internal or external memory. The memory 1610 may also be referred to as a memory unit, a memory circuit, memory mining means, a memory module or a computer usable medium.

Those skilled in the art will also appreciate that the receiver 1601, the identifying unit 1603, the transmitter 1605 and the determining unit 1608 described above may refer to a combination of analog and digital circuits, and/or one or more processors configured with software and/or firmware, e.g. stored in a memory, that when executed by the one or more processors such as the processor 1615 perform as described above with reference to FIG. 15. The processor 1615 may also be referred to as a processing unit, processing circuit, processing means or processing module circuit, A computer program product or a computer program may be directly loadable into an internal memory of a digital computer within at least one entity of the central network node 610. The computer program product comprises software code portions for performing the method as described with reference to FIG. 15 when said product is run on a computer.

A computer program product or a computer program may be stored on a computer usable medium. The computer program product comprises a computer readable program for causing a computer, within an entity in the central network node 610 to control an execution of the method as described with reference to FIG. 15 above.

The embodiments herein may be implemented through one or more processors, such as a processor 1210 in the first network node 601 depicted in FIG. 12, a processor 1415 in the wireless device 605 depicted in FIG. 14 and a processor 1615 in the central network node 610 depicted in FIG. 16, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the first network node 601 and/or the wireless device 605 and/or the central network node 610. One such carrier may be in the form of a CD ROM disc. It is however feasible with other data carriers such as a memory stick. The computer program code may furthermore be provided as pure program code on a server and downloaded to the first network node 601 and/or the wireless device 605 and/or the central network node 610.

As mentioned above a Pilot CHannel (PICH) is a term used in the WCDMA/HSPA RAN1 specification and is a term for a pilot (signal) or reference signal. Therefore, a PICH such as e.g. the F-CPICH, S-CPICH, S-F-CPICH, P-CPICH may be referred to as F-CPICH signal, S-CPICH signal, S-F-CPICH signal and P-CPICH signal.

Summarized:
a. Using two sets of pilot signals for identifying and scheduling wireless devices with multiple antennas.
b. Using multiple probing pilot signals for identifying wireless devices with multiple antennas.
c. Using secondary pilot signals for probing based on the wireless device type such that the impact on legacy wireless devices is less
d. Using secondary pilot signals for probing based on the wireless device type so to minimize the pilot signal usage.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The term "configured to" used herein may also be referred to as "arranged to" or "adapted to".

It should also be emphasised that the steps of the methods defined in the appended claims may, without departing from the embodiments herein, be performed in another order than the order in which they appear.

The invention claimed is:

1. A method in a communications network for enabling transmission of data to a wireless device, wherein the communications network applies a combined cell deployment, and wherein the communications network comprises a first network node, a wireless device and a central network node arranged to communicate with each other, the method comprising:
transmitting a first probing pilot signal from a first network node to the wireless device, wherein the first probing pilot signal is unique for the first network node;
transmitting a second signal from the first network node to the wireless device, wherein the second signal is unique for the first network node, and wherein the first probing pilot signal together the second signal enables identification of the first network node as suitable to transmit data to the wireless device;
transmitting a first and second set of channel state parameters from the wireless device to the central network node, wherein the first and second set of channel state parameters are estimated by the wireless device based on the first probing pilot signal and the second signal; and based on the first and second set of channel state parameters, identifying, at the central network node, that the first network node is suitable to transmit data to the wireless device.

\* \* \* \* \*